US012561514B2

(12) United States Patent
    Krishnaditya et al.

(10) Patent No.: US 12,561,514 B2
(45) Date of Patent: Feb. 24, 2026

(54) METHOD AND SYSTEM FOR CLASSIFYING ONE OR MORE HYPERLINKS IN A DOCUMENT

(71) Applicant: Samsung Electronics Co., Ltd., Suwon-si (KR)

(72) Inventors: Krishnaditya Krishnaditya, Bengaluru (IN); Rohini Nookala, Bangalore (IN); Pinaki Bhaskar, Bangalore (IN); Aniruddha Bala, Bengaluru (IN); Ankit Sharma, Bangalore (IN); Vikram Mupparthi, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 146 days.

(21) Appl. No.: 18/532,356

(22) Filed: Dec. 7, 2023

(65) Prior Publication Data

US 2024/0126977 A1 Apr. 18, 2024

Related U.S. Application Data

(63) Continuation of application No. PCT/KR2023/015760, filed on Oct. 12, 2023.

(30) Foreign Application Priority Data

Oct. 12, 2022 (IN) .............................. 202241058341

(51) Int. Cl.
*G06F 40/134* (2020.01)

(52) U.S. Cl.
CPC ................................. *G06F 40/134* (2020.01)

(58) Field of Classification Search
CPC ..................................................... G06F 40/134
See application file for complete search history.

(56) References Cited

U.S. PATENT DOCUMENTS

| | | | |
|---|---|---|---|
| 7,516,397 | B2 | 4/2009 | Joshi et al. |
| 8,521,667 | B2 | 8/2013 | Zhu et al. |
| 10,353,994 | B2 | 7/2019 | Upadhyay et al. |
| 11,093,971 | B2 | 8/2021 | Kurian et al. |
| 11,238,211 | B2 | 2/2022 | van de Kerkhof et al. |
| 11,429,897 | B1 | 8/2022 | Cobb et al. |
| 11,455,464 | B2 | 9/2022 | Hook et al. |
| 2008/0228675 | A1 | 9/2008 | Duffy et al. |
| 2009/0298036 | A1* | 12/2009 | Greenspan ............. G09B 5/062 |
| | | | 715/205 |

(Continued)

OTHER PUBLICATIONS

Patrick Kenekayoro et al., Motivation for Hyperlink Creation Using Inter-Page Relationships (Oct. 24, 2013).

(Continued)

*Primary Examiner* — Asher D Kells
(74) *Attorney, Agent, or Firm* — Jefferson IP Law, LLP

(57) ABSTRACT

A method and a system for classifying one or more hyperlinks in a document are provided. The method includes identifying the one or more hyperlinks in the document based on an analysis of text strings of the document. The method further includes analyzing surrounding text strings around each of the one or more hyperlinks and classifying, based on the analysis of the surrounding text strings around each of the one or more hyperlinks, the one or more hyperlinks into at least one category among a plurality of predetermined categories.

14 Claims, 21 Drawing Sheets

(56)     References Cited

U.S. PATENT DOCUMENTS

| 2009/0319449 | A1* | 12/2009 | Gamon | ............... | G06F 16/94 |
| | | | | | 706/46 |
| 2010/0275117 | A1* | 10/2010 | Vion-Dury | ......... | G06F 16/9558 |
| | | | | | 715/234 |
| 2010/0287174 | A1 | 11/2010 | Yang et al. | | |
| 2013/0074129 | A1 | 3/2013 | Reisman | | |
| 2014/0122456 | A1 | 5/2014 | Dies | | |
| 2015/0026152 | A1 | 1/2015 | Singh et al. | | |
| 2016/0162452 | A1* | 6/2016 | Moore | ............... | G06F 16/951 |
| | | | | | 715/205 |
| 2019/0065615 | A1* | 2/2019 | Room | ............... | G06F 16/954 |
| 2019/0102368 | A1* | 4/2019 | Waran | ............... | G06F 16/9577 |
| 2023/0229711 | A1* | 7/2023 | Schafer | ............... | G06F 40/134 |
| | | | | | 707/740 |

OTHER PUBLICATIONS

Deebanchakkarawarthi G et al., Classification of URL into Malicious or Benign using Machine Learning Approach (Feb. 2019).
Nicolas Rodolfo Fauceglia et al., Automatic Taxonomy Induction and Expansion (Nov. 3, 2019).
International Search Report dated Jan. 9, 2024, issued in International Application No. PCT/KR2023/015760.
Indian Office Action dated Jun. 27, 2025; Indian Appln. No. 202241058341.

* cited by examiner

Figure 1:
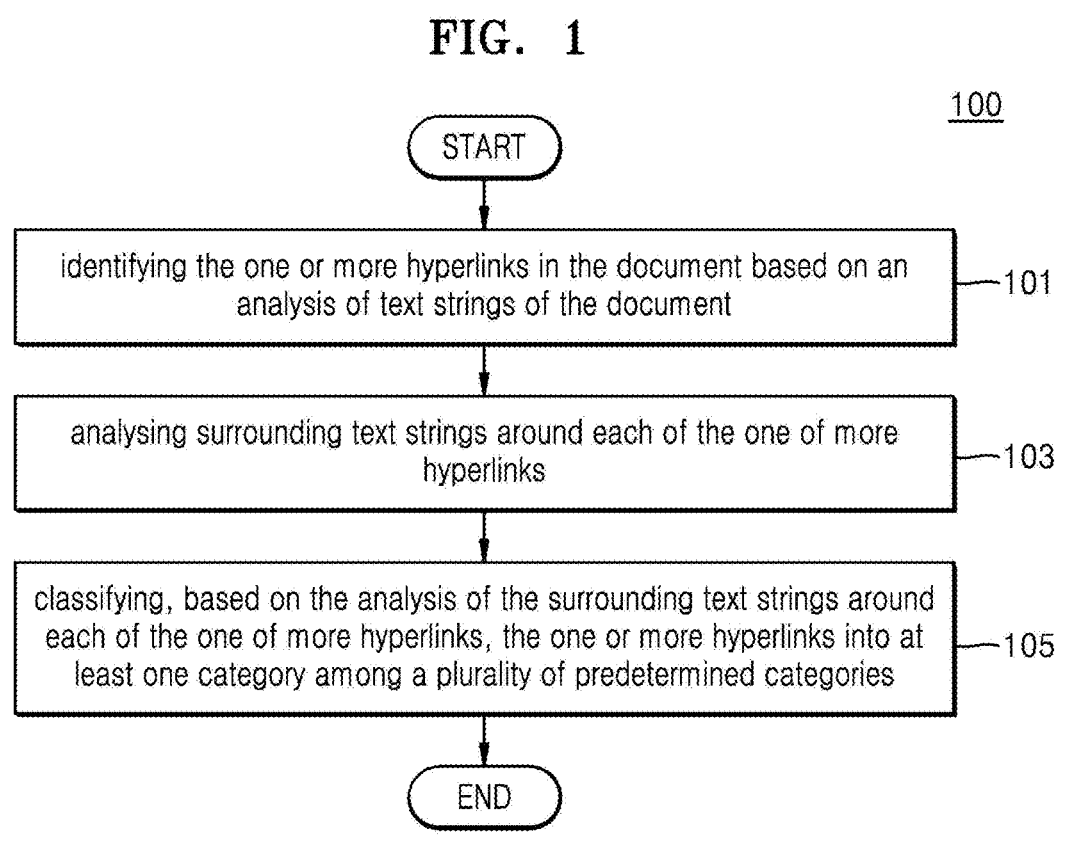

```
        ( START )
            │
            ▼
┌────────────────────────────────────────────────┐
│ identifying the one or more hyperlinks in the  │
│ document based on an                           │──101
│ analysis of text strings of the document       │
└────────────────────────────────────────────────┘
            │
            ▼
┌────────────────────────────────────────────────┐
│ analysing surrounding text strings around each │
│ of the one of more                             │──103
│ hyperlinks                                     │
└────────────────────────────────────────────────┘
            │
            ▼
┌────────────────────────────────────────────────┐
│ classifying, based on the analysis of the      │
│ surrounding text strings around                │
│ each of the one of more hyperlinks, the one or │──105
│ more hyperlinks into at                        │
│ least one category among a plurality of        │
│ predetermined categories                       │
└────────────────────────────────────────────────┘
            │
            ▼
        ( END )
```

FIG. 4

FIG. 12A xxx   x   +

Figure 12A:
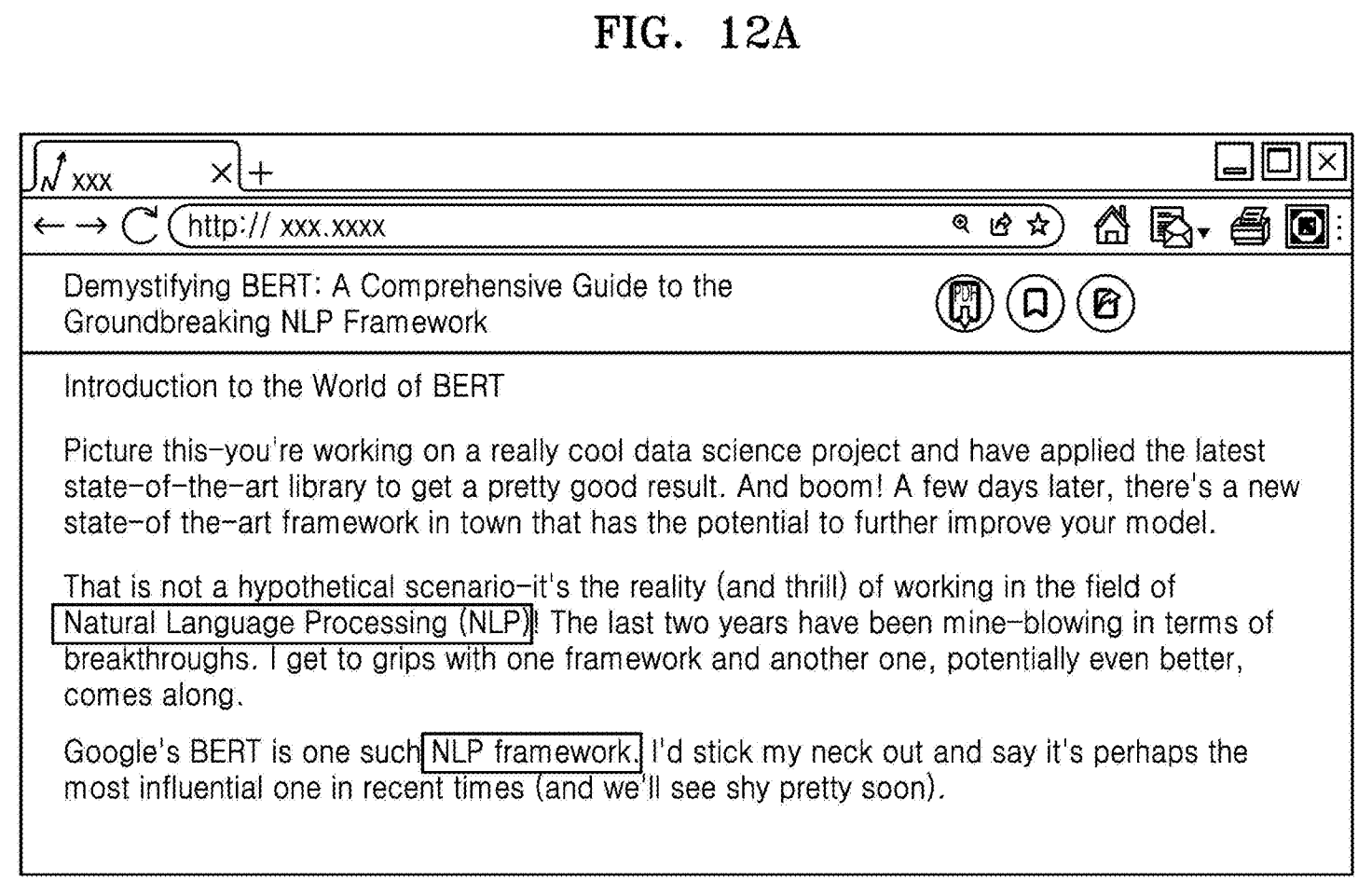

← → C ( http:// xxx.xxxx )

Demystifying BERT: A Comprehensive Guide to the
Groundbreaking NLP Framework

Introduction to the World of BERT

Picture this—you're working on a really cool data science project and have applied the latest
state-of-the-art library to get a pretty good result. And boom! A few days later, there's a new
state-of-the-art framework in town that has the potential to further improve your model.

That is not a hypothetical scenario—it's the reality (and thrill) of working in the field of
Natural Language Processing (NLP). The last two years have been mine-blowing in terms of
breakthroughs. I get to grips with one framework and another one, potentially even better,
comes along.

Google's BERT is one such NLP framework. I'd stick my neck out and say it's perhaps the
most influential one in recent times (and we'll see shy pretty soon).

FIG. 12C

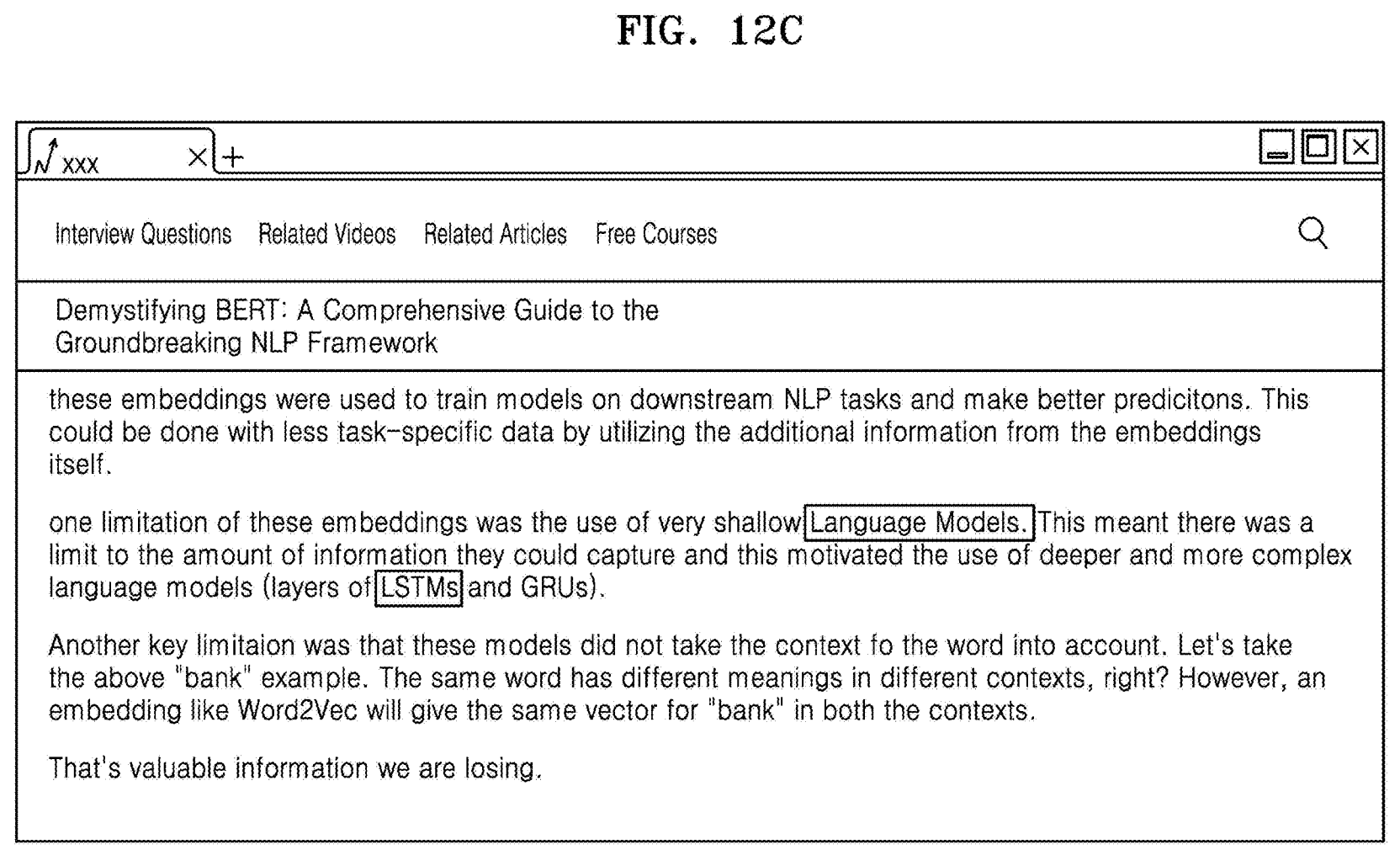

Interview Questions    Related Videos    Related Articles    Free Courses

Demystifying BERT: A Comprehensive Guide to the Groundbreaking NLP Framework these embeddings were used to train models on downstream NLP tasks and make better predicitons. This could be done with less task–specific data by utilizing the additional information from the embeddings itself.

one limitation of these embeddings was the use of very shallow Language Models. This meant there was a limit to the amount of information they could capture and this motivated the use of deeper and more complex language models (layers of LSTMs and GRUs).

Another key limitaion was that these models did not take the context to the word into account. Let's take the above "bank" example. The same word has different meanings in different contexts, right? However, an embedding like Word2Vec will give the same vector for "bank" in both the contexts.

That's valuable information we are losing.

FIG. 12D http:// xxx.xxxx

Figure 12D:
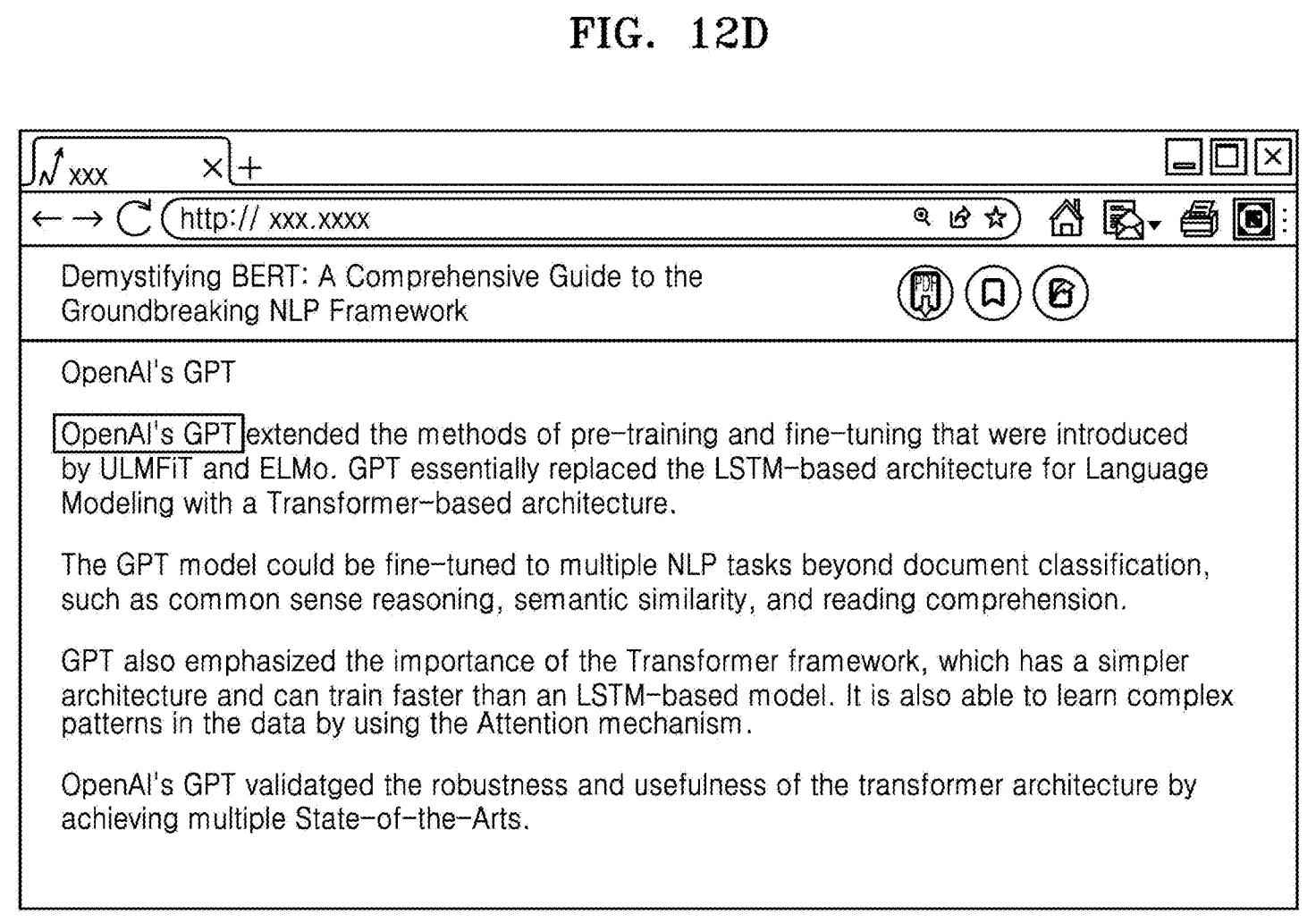

Demystifying BERT: A Comprehensive Guide to the
Groundbreaking NLP Framework

OpenAI's GPT

OpenAI's GPT extended the methods of pre-training and fine-tuning that were introduced
by ULMFiT and ELMo. GPT essentially replaced the LSTM-based architecture for Language
Modeling with a Transformer-based architecture.

The GPT model could be fine-tuned to multiple NLP tasks beyond document classification,
such as common sense reasoning, semantic similarity, and reading comprehension.

GPT also emphasized the importance of the Transformer framework, which has a simpler
architecture and can train faster than an LSTM-based model. It is also able to learn complex
patterns in the data by using the Attention mechanism.

OpenAI's GPT validatged the robustness and usefulness of the transformer architecture by
achieving multiple State-of-the-Arts.

FIG. 14

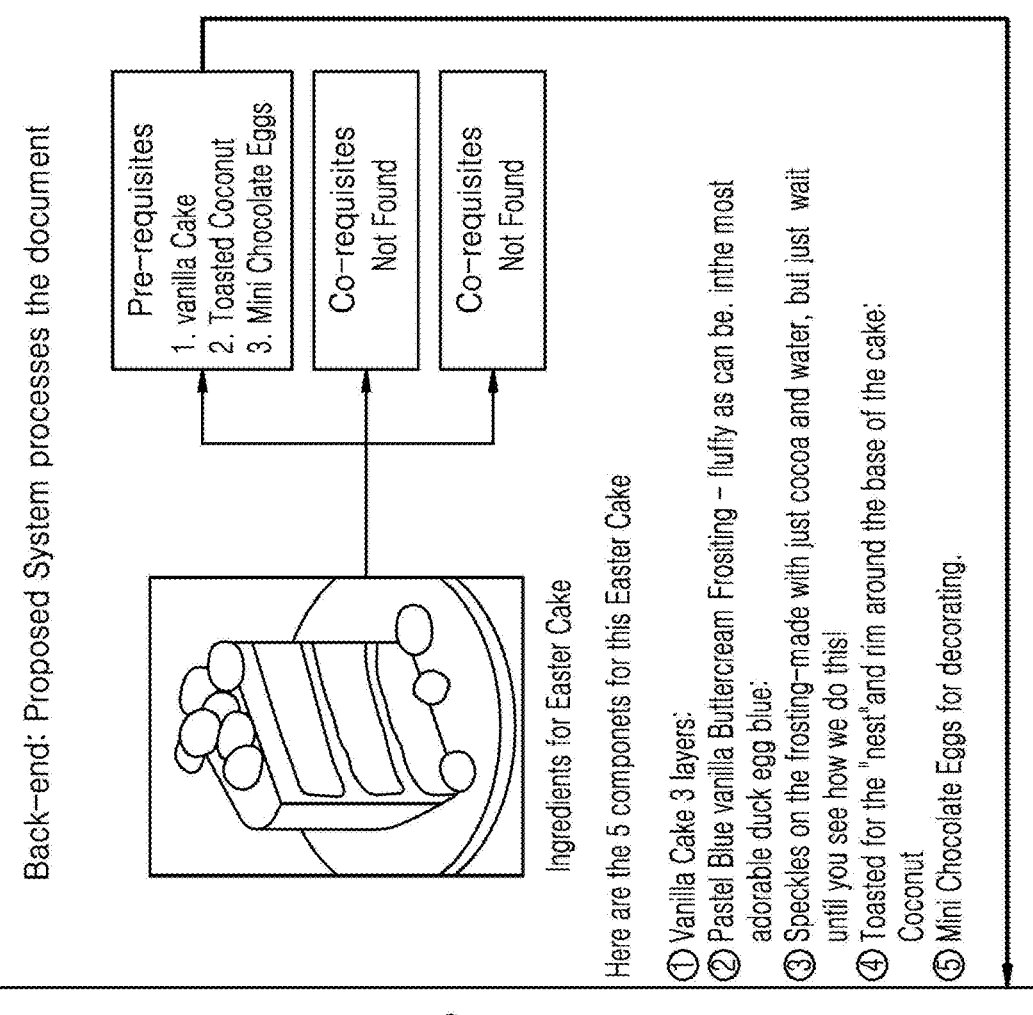

Back-end: Proposed System processes the document

Pre-requisites
1. vanilla Cake
2. Toasted Coconut
3. Mini Chocolate Eggs

Co-requisites
Not Found

Co-requisites
Not Found

Ingredients for Easter Cake

Here are the 5 componets for this Easter Cake

① Vanilla Cake 3 layers:

② Pastel Blue vanilla Buttercream Frositing – fluffy as can be. inthe most adorable duck egg blue:

③ Speckles on the frosting-made with just cocoa and water, but just wait until you see how we do this!

④ Toasted for the "nest" and rim around the base of the cake: Coconut

⑤ Mini Chocolate Eggs for decorating.

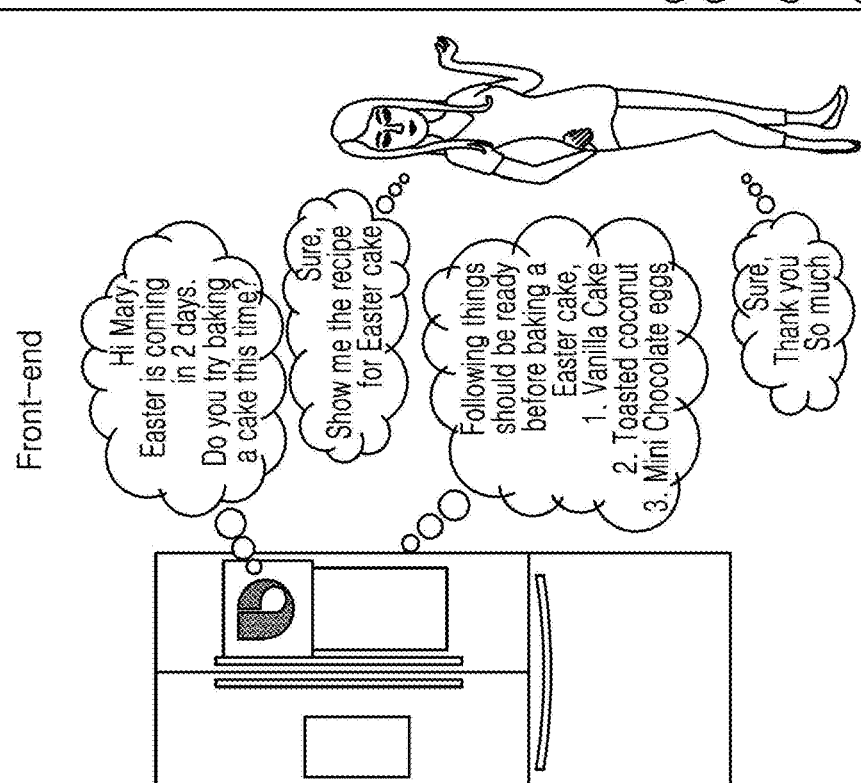

Front-end

Hi Mary, Easter is coming in 2 days. Do you try baking a cake this time?

Sure, Show me the recipe for Easter cake

Following things should be ready before baking a Easter cake,
1. Vanilla Cake
2. Toasted coconut
3. Mini Chocolate eggs Sure, Thank you So much

FIG. 15

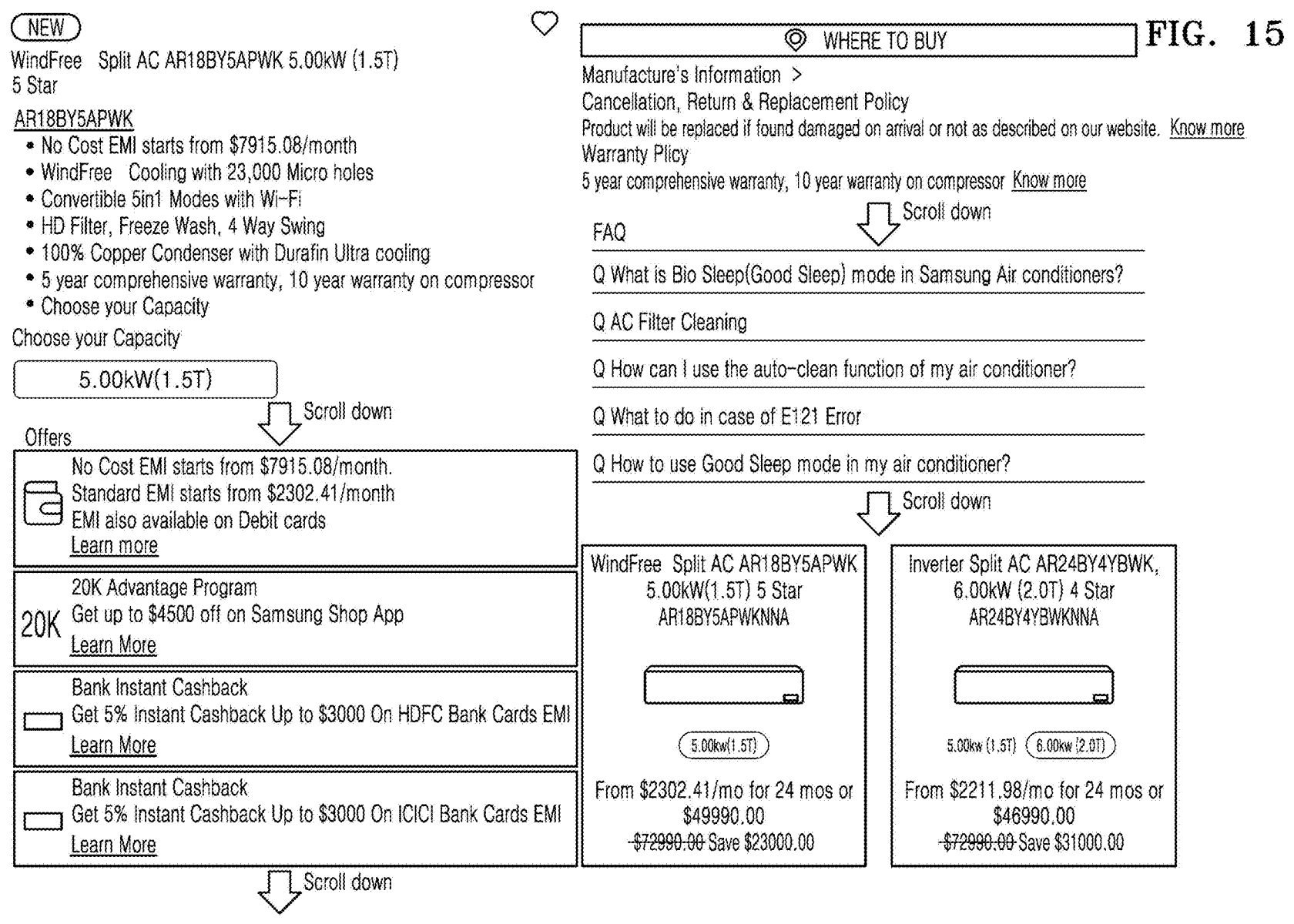

◎ WHERE TO BUY

Manufacture's Information >
Cancellation, Return & Replacement Policy
Product will be replaced if found damaged on arrival or not as described on our website. Know more
Warranty Plicy
5 year comprehensive warranty, 10 year warranty on compressor Know more ⟹ Scroll down

FAQ

Q What is Bio Sleep(Good Sleep) mode in Samsung Air conditioners?

Q AC Filter Cleaning

Q How can I use the auto-clean function of my air conditioner?

Q What to do in case of E121 Error

Q How to use Good Sleep mode in my air conditioner?

⟹ Scroll down

---

♡

(NEW)
WindFree Split AC AR18BY5APWK 5.00kW (1.5T)
5 Star
AR18BY5APWK
• No Cost EMI starts from $7915.08/month
• WindFree Cooling with 23,000 Micro holes
• Convertible 5in1 Modes with Wi-Fi
• HD Filter, Freeze Wash, 4 Way Swing
• 100% Copper Condenser with Durafin Ultra cooling
• 5 year comprehensive warranty, 10 year warranty on compressor
• Choose your Capacity
Choose your Capacity

[ 5.00kW(1.5T) ]

⟹ Scroll down

Offers

No Cost EMI starts from $7915.08/month.
Standard EMI starts from $2302.41/month
EMI also available on Debit cards
Learn more 20K Advantage Program
20K Get up to $4500 off on Samsung Shop App
Learn More ☐ Bank Instant Cashback
Get 5% Instant Cashback Up to $3000 On HDFC Bank Cards EMI
Learn More ☐ Bank Instant Cashback
Get 5% Instant Cashback Up to $3000 On ICICI Bank Cards EMI
Learn More ⟹ Scroll down

---

WindFree Split AC AR18BY5APWK
5.00kW(1.5T) 5 Star
AR18BY5APWKNNA ( 5.00kw(1.5T) )

From $2302.41/mo for 24 mos or
$49990.00
$72990.00 Save $23000.00

---

Inverter Split AC AR24BY4YBWK,
6.00kW (2.0T) 4 Star
AR24BY4YBWKNNA ( 5.00kw (1.5T) ) ( 6.00kw /2.0T) )

From $2211.98/mo for 24 mos or
$46990.00
$72990.00 Save $31000.00

FIG. 16

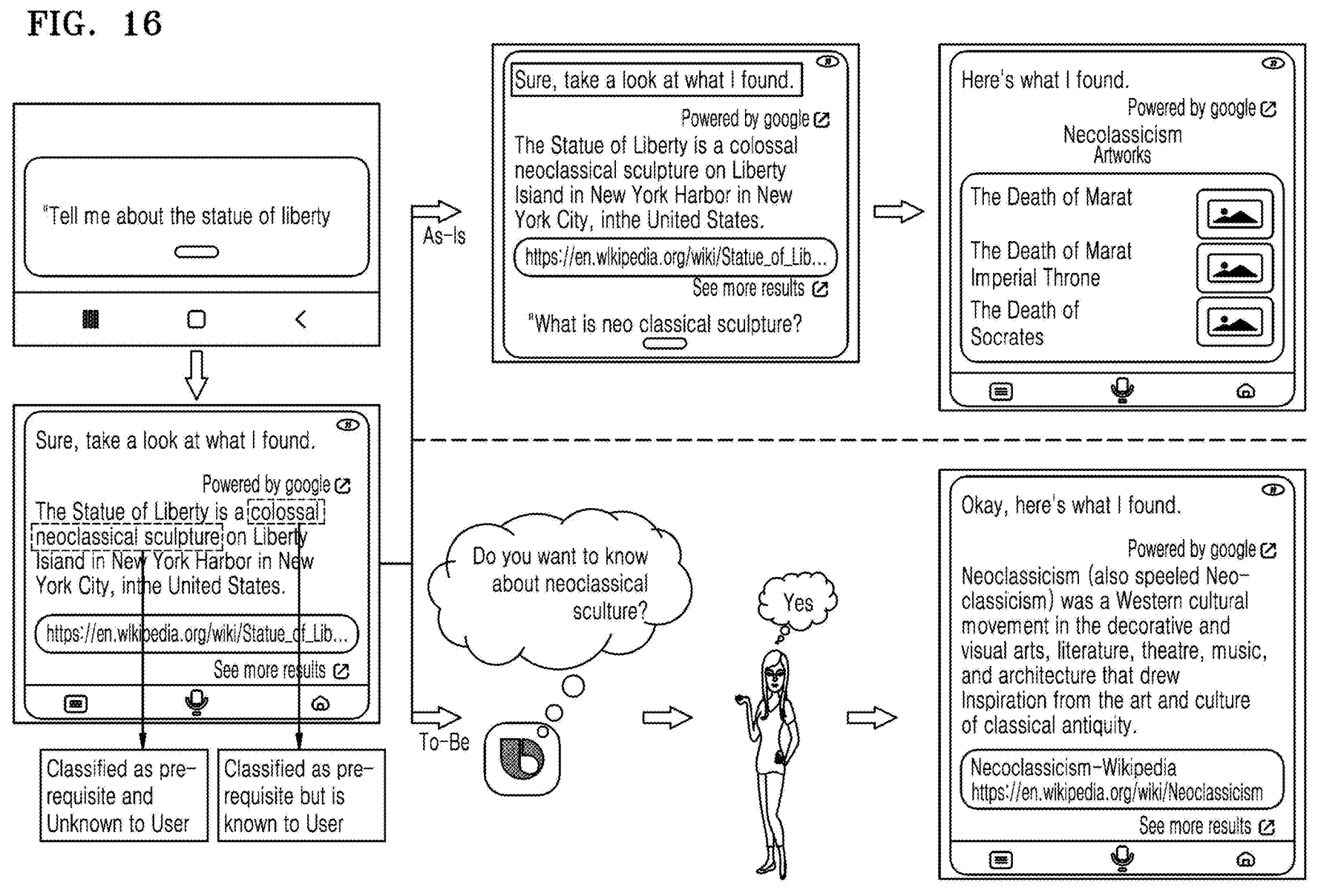

"Tell me about the statue of liberty"

Sure, take a look at what I found.

Powered by google

The Statue of Liberty is a |colossal| |neoclassical sculpture| on Liberty Island in New York Harbor in New York City, in the United States.

https://en.wikipedia.org/wiki/Statue_of_Lib...

See more results

Classified as pre-requisite and Unknown to User

Classified as pre-requisite but is known to User

As-Is

Sure, take a look at what I found.

Powered by google

The Statue of Liberty is a colossal neoclassical sculpture on Liberty Island in New York Harbor in New York City, in the United States.

https://en.wikipedia.org/wiki/Statue_of_Lib...

See more results

"What is neo classical sculpture?"

To-Be

Do you want to know about neoclassical scultulre?

Yes

Here's what I found.

Powered by google

Necolassicism Artworks

The Death of Marat

The Death of Marat Imperial Throne

The Death of Socrates

Okay, here's what I found.

Powered by google

Neoclassicism (also speeled Neo-classicism) was a Western cultural movement in the decorative and visual arts, literature, theatre, music, and architecture that drew Inspiration from the art and culture of classical antiquity.

Neoclassicism-Wikipedia https://en.wikipedia.org/wiki/Neoclassicism

See more results

METHOD AND SYSTEM FOR CLASSIFYING ONE OR MORE HYPERLINKS IN A DOCUMENT

CROSS-REFERENCE TO RELATED APPLICATION(S)

This application is a continuation application, claiming priority under § 365(c), of an International application No. PCT/KR2023/015760, filed on Oct. 12, 2023, which is based on and claims the benefit of an Indian patent application number 202241058341, filed on Oct. 12, 2022, in the Indian Patent Office, the disclosure of which is incorporated by reference herein in its entirety.

FIELD OF THE INVENTION

The disclosure relates to a method and a system for classifying one or more hyperlinks in a document.

BACKGROUND

Tremendous growth of the Web (World Wide Web Internet service) over the past few years has made a vast amount of information available to users. This information is available in different types of documents. Such documents have several concepts embedded as hyperlinks in them and to better understand the concepts, a user needs to visit numerous such hyperlinks and eventually return to the main document. A prime issue faced by the user is maintaining the readability of the topic in the main document by managing visits between multiple associated hyperlinks and the main document. Thus, there seems to be a need for a solution that increases the readability of the topic in the main document containing multiple hyperlinks.

The above information is presented as background information only to assist with an understanding of the disclosure. No determination has been made, and no assertion is made, as to whether any of the above might be applicable as prior art with regard to the disclosure.

SUMMARY OF THE PRESENT DISCLOSURE

Aspects of the disclosure are to address at least the above-mentioned problems and/or disadvantages and to provide at least the advantages described below. Accordingly, an aspect of the disclosure is to provide a method and a system for classifying one or more hyperlinks in a document.

Additional aspects will be set forth in part in the description which follows and, in part, will be apparent from the description, or may be learned by practice of the presented embodiments.

In accordance with an aspect of the disclosure, a method for classifying one or more hyperlinks in a document is provided. The method includes identifying the one or more hyperlinks in the document based on an analysis of text strings in the document. The method further includes analyzing surrounding text strings around each of the one or more hyperlinks and classifying, based on the analysis of the surrounding text strings around each of the one or more hyperlinks, the one or more hyperlinks into at least one category among a plurality of predetermined categories.

In accordance with another aspect of the disclosure, a system for classifying one or more hyperlinks in a document is provided. The system includes an identification unit configured to identify the one or more hyperlinks in the document based on an analysis of text strings in the document. The system further includes an analysis unit configured to analyze surrounding text strings around each of the one or more hyperlinks and a classification unit configured to classifying, based on the analysis of the surrounding text strings around each of the one or more hyperlinks, the one or more hyperlinks into at least one category among a plurality of predetermined categories.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1 illustrates a method depicting a method for classifying one or more hyperlinks in a document, according to an embodiment of the disclosure;

FIG. 4 illustrates a block diagram representing the classification of the one or more hyperlinks in the document, according to an embodiment of the disclosure;

FIG. 12A illustrates various use cases of classifying the one or more hyperlinks in the document, according to various embodiments of the disclosure;

FIG. 12C illustrates various use cases of classifying the one or more hyperlinks in the document, according to various embodiments of the disclosure;

FIG. 12D illustrates various use cases of classifying the one or more hyperlinks in the document, according to various embodiments of the disclosure;

FIG. 14 illustrates various use cases of classifying the one or more hyperlinks in the document, according to various embodiments of the disclosure;

FIG. 15 illustrates various use cases of classifying the one or more hyperlinks in the document, according to various embodiments of the disclosure; and FIG. 16 illustrates comparison of classifying the one or more hyperlinks in a document between prior arts and the disclosure, according to an embodiment of the disclosure.

Throughout the drawings, it should be noted that like reference numbers are used to depict the same or similar elements, features, and structures.

DETAILED DESCRIPTION

Figure 2:
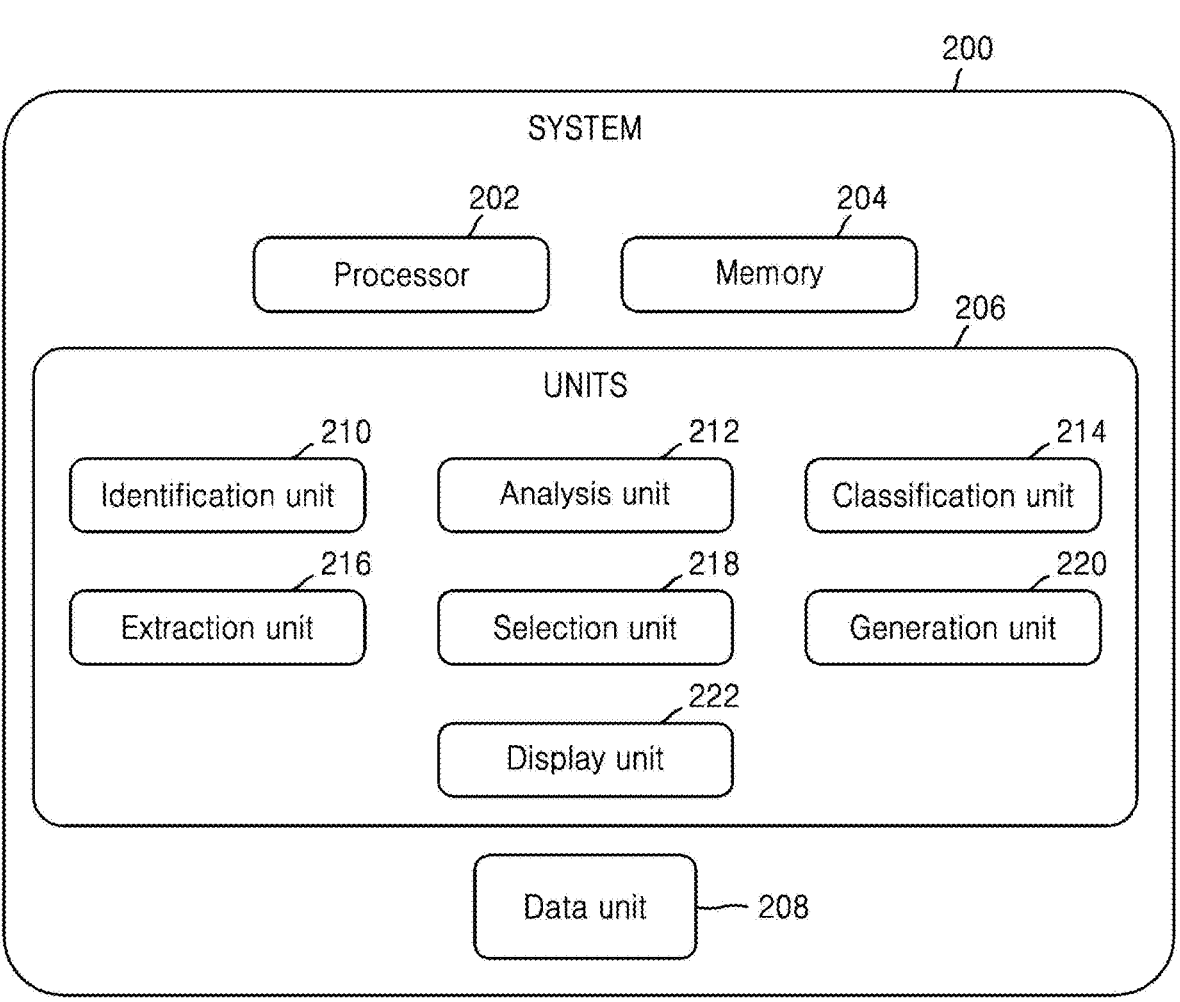
FIG. 2 illustrates a block diagram of a system for classifying the one or more hyperlinks in the document, according to an embodiment of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "some" as used herein is defined as "none, or one, or more than one, or all." Accordingly, the terms "none," "one," "more than one," "more than one, but not all" or "all" would all fall under the definition of "some." The term "some embodiments" may refer to no embodiments, one embodiment, several embodiments, or all embodiments. Accordingly, the term "some embodiments" is defined as meaning "no embodiment, or one embodiment, or more than one embodiment, or all embodiments."

The terminology and structure employed herein is for describing, teaching, and illuminating some embodiments and their specific features and elements and does not limit, restrict, or reduce the spirit and scope of the claims or their equivalents.

More specifically, any terms used herein such as but not limited to "includes," "comprises," "has," "consists," and grammatical variants thereof do NOT specify an exact limitation or restriction and certainly do NOT exclude the possible addition of one or more features or elements, unless otherwise stated, and furthermore must NOT be taken to exclude the possible removal of one or more of the listed features and elements, unless otherwise stated with the limiting language "MUST comprise" or "NEEDS TO include."

Whether or not a certain feature or element was limited to being used only once, either way it may still be referred to as "one or more features" or "one or more elements" or "at least one feature" or "at least one element." Furthermore, the use of the terms "one or more" or "at least one" feature or element do NOT preclude there being none of that feature or element, unless otherwise specified by limiting language such as "there NEEDS to be one or more . . . " or "one or more element is REQUIRED."

Unless otherwise defined, all terms, and especially any technical and/or scientific terms, used herein may be taken to have the same meaning as commonly understood by one having an ordinary skill in the art.

The disclosure is directed toward intelligently creating personalized categorization of hyperlinks (i.e., pre-requisite, co-requisite, and post-requisite) without visiting the hyperlinks with link representator when a user browses through any document (e.g., webpage, article etc.) in real-time.

Embodiments of the disclosure will be described below in detail with reference to the accompanying drawings.

FIG. 1 illustrates a method 100 depicting a method for classifying one or more hyperlinks in a document, according to an embodiment of the disclosure.

FIG. 2 illustrates a block diagram of a system 200 for classifying the one or more hyperlinks in the document, according to an embodiment of the disclosure.

Figure 3:
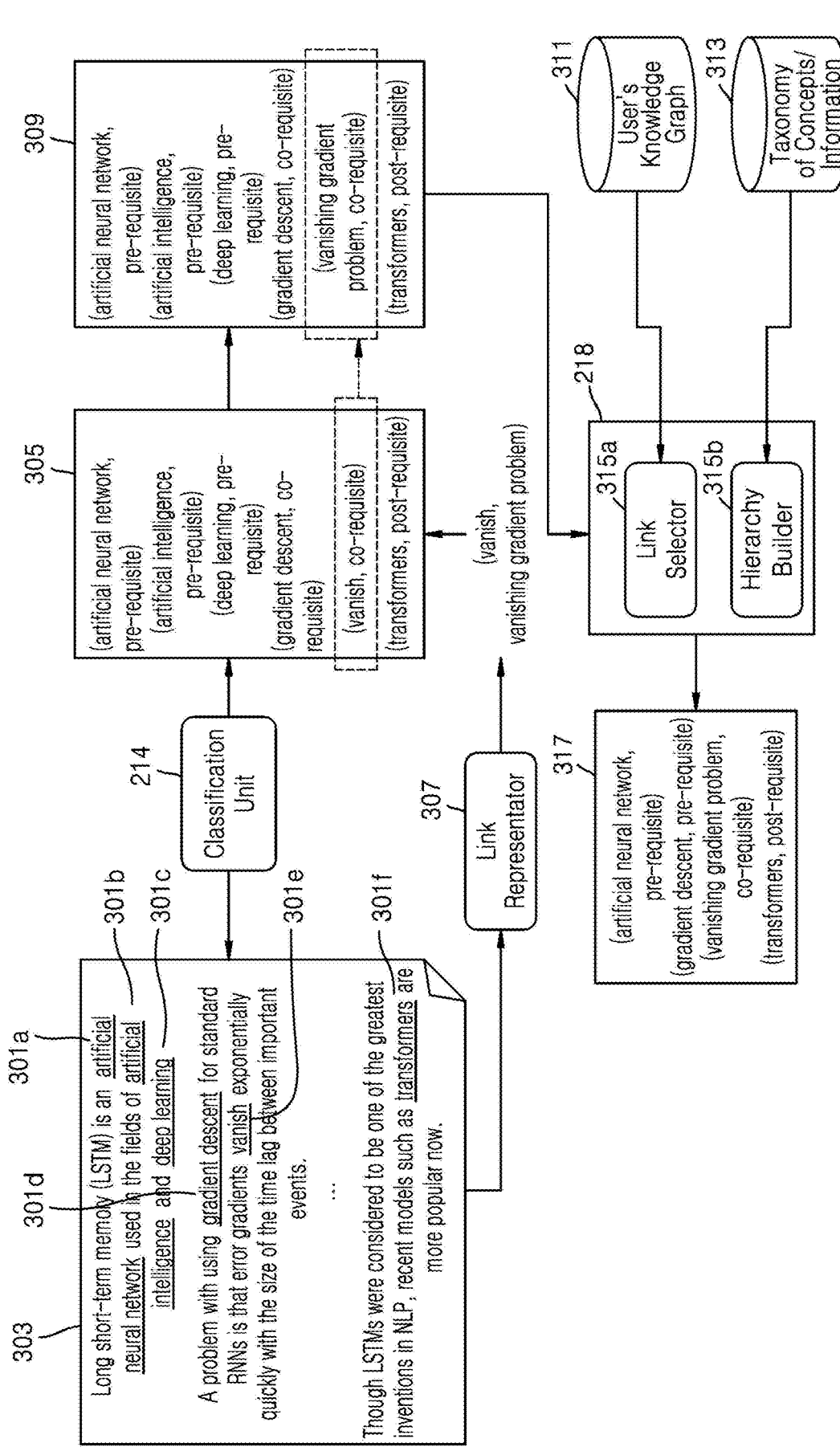
FIG. 3 illustrates various stages of classifying the one or more hyperlinks in the document, according to an embodiment of the disclosure.

FIG. 3 illustrates various stages of classifying the one or more hyperlinks in the document, according to an embodiment of the disclosure. For the sake of brevity, the description of the FIGS. 1, 2, and 3 are explained in conjunction with each other.

Referring to FIGS. 1-3, the system 200 may include, but is not limited to, a processor 202, a memory 204, units 206, and a data unit 208. The units 206 and the memory 204 may be coupled to the processor 202.

The processor 202 may be a single processing unit or several units, all of which could include multiple computing units. The processor 202 may be implemented as one or more microprocessors, microcomputers, microcontrollers, digital signal processors, central processing units, state machines, logic circuitries, and/or any devices that manipulate signals based on operational instructions. Among other capabilities, the processor 202 is configured to fetch and execute computer-readable instructions and data stored in the memory 204.

The memory 204 may include any non-transitory computer-readable medium known in the art, including volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

The units 206 amongst other things, include routines, programs, objects, components, data structures, etc., which perform particular tasks or implement data types. The units 206 may also be implemented as, signal processor(s), state machine(s), logic circuitries, and/or any other device or component that manipulate signals based on operational instructions.

The units 206 can be implemented in a hardware, instructions executed by a processing unit, or by a combination thereof. The processing unit can comprise a computer, a processor, such as the processor 202, a state machine, a logic array, or any other suitable devices capable of processing instructions. The processing unit can be a general-purpose processor which executes instructions to cause the general-purpose processor to perform the required tasks or, the processing unit can be dedicated to performing the required functions. In another embodiment of the disclosure, the units 206 may be machine-readable instructions (software) which, when executed by a processor/processing unit, perform any of the described functionalities.

In an embodiment, the units 206 may include an identification unit 210, an analysis unit 212, a classification unit 214, an extraction unit 216, a selection unit 218, a generation unit 220, and a display unit 222.

The various units 210-222 may be in communication with each other. In an embodiment, the various units 210-222 may be a part of the processor 202. In another embodiment, the processor 202 may be configured to perform the functions of units 210-222. The data unit 208 serves, amongst other things, as a repository for storing data processed, received, and generated by one or more of the units 206.

According to an embodiment of the disclosure, the system 200 may be a part of an electronic device on which the document is accessed. According to another embodiment, the system 200 may be coupled to an electronic device on which the document is accessed. It should be noted that the term "electronic device" refers to any electronic devices used by a user such as a mobile device, a desktop, a laptop, a personal digital assistant (PDA) or similar devices.

Referring to FIG. 1, at operation 101, the method comprises identifying the one or more hyperlinks in the document based on an analysis of the text strings in the document. In an embodiment, the document may correspond to one of a text document, a web document, an application based document, a cloud based document, or any other document.

Referring to FIGS. 2 and 3, the identification unit 210 may identify the one or more hyperlinks 301*a*-301*f* in the document 303 based on the analysis of the text strings in the document 303. For example, by analyzing the text string "Long short-term memory (LSTM) is an artificial neural network used in the fields of artificial intelligence and deep learning", the identification unit 210 may identify hyperlinks 301*a*-301*c*, i.e., artificial neural network, artificial intelligence, and deep learning. Similarly, by analyzing the text string "a problem with using gradient descent for standard RNNs is that error gradients vanish exponentially quickly with the size of the time lag between important events", the identification unit 210 may identify hyperlinks 301*d*-301*e*, i.e., gradient descent, and vanish. Similarly, by analyzing the text string "Though LSTMs were considered to be one of the greatest inventions in NLP, recent models such as transformers are more popular now", the identification unit 210 may identify hyperlink 301*f*, transformers. It should be noted that the identification unit 210 may identify the one or more hyperlinks using a technique known to a person skilled in the art.

Thereafter, at operation 103, the method 100 comprises analyzing surrounding text strings around each of the one or more hyperlinks. In an embodiment, the analysis unit 212 may analyze the surrounding text strings around each of the hyperlinks to determine a position of words in the surrounding text strings with respect to the hyperlinks. For example, in reference to FIG. 3, for the surrounding text strings around the hyperlink "artificial neural network", the position of each word in the text string may be determined by analyzing the text string, such as the position of the word "LSTM" is third left to the hyperlink "artificial neural network".

At operation 105, the method 100 may comprise classifying, based on the analysis of the surrounding text strings around each of the one or more hyperlinks, the one or more hyperlinks into at least one category from a plurality of predetermined categories. In an embodiment, the plurality of predetermined categories may include a pre-requisite category, a co-requisite category, or a post-requisite category. The pre-requisite category refers to a category where the user is recommended to access the hyperlink before reading the content of the document 303. The co-requisite category refers to a category where the user is recommended to simultaneously access the hyperlink along with reading the content of the document 303. The post-requisite category refers to a category where the user is recommended to access the hyperlink after reading the content of the document 303. In an embodiment, the classification unit 214 may classify the one or more hyperlinks using the surrounding text strings without referring to the one or more hyperlinks. For example, in reference to the FIG. 3, the classification unit 214 may classify each of the hyperlinks 301*a*-301*f* in one of the categories, such as, hyperlinks 301*a*-301*c* may be classified into the pre-requisite category, hyperlinks 301*d*-301*e* may be classified into the co-requisite category, and the hyperlink 301*f* may be classified into the post-requisite category, as shown in block 305.

Units 307-317 shown in FIG. 3 are described below in reference to FIGS. 4, 5, 6, 7A, 7B, 8 to 10, 11A, and 11B.

Figure 4:
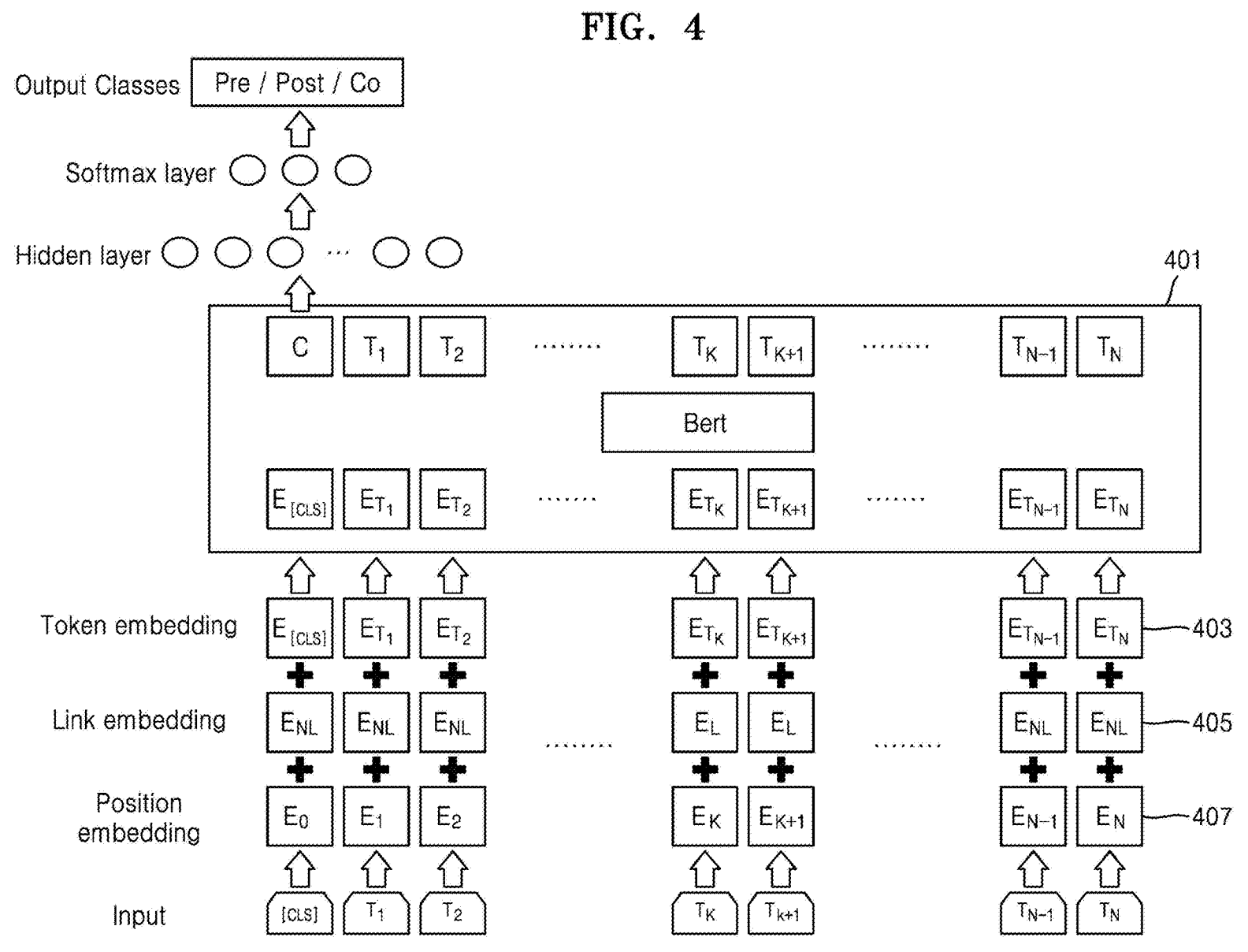

FIG. 4 illustrates a block diagram representing the classification of the one or more hyperlinks in the document 303, according to an embodiment of the disclosure.

Referring to FIG. 4, in an embodiment, a BERT model 401 is used to classify the one or more hyperlinks in the document 303. At block 403, the system 200 performs a token embedding on an input text string in the document 303. In an embodiment, WordPiece embedding is used for token embedding of the given input text string. The token embedding transforms words into vector representation of a fixed dimension of 768. Let us consider the following example "LSTM networks are well-suited to classifying". The system 200 first tokenizes the text string as: "1stm net ##works are well ##-##suited to classify ##ing". These are 10 tokens. Further, the system 200 represents each token as a 768-dimensional vector. Thus, a matrix of shape (10*768) is obtained.

At block 405, the system 200 performs link embedding. In an embodiment, two learned embeddings (EL and ENL) of size 768 each is used to distinguish link words and non-link words. In an embodiment, the link words may refer to words present in the hyperlink and the non-link words may refer to words present in the text strings surrounding the hyperlink. For example, ENL is used for the first 8 tokens and EL is used for the last two tokens representing the link. These embeddings are added to the token embedding elementwise. Thereafter, the system 200 obtains a matrix of shape (10, 768).

At block 407, the system 200 performs position embedding. In an embodiment, the position embedding is used to feed the positions of each word in the text string to the model. Position embedding is a vector of size 768 which is different for every position. In an example, the position embedding is different for all 10 tokens. These embeddings are added to the matrix obtained at block 407 elementwise and finally a matrix of shape (10,768) is obtained, which is fed to the BERT model 401.

From the BERT model 401, a final embedding of Classification token (CLS) is obtained, which is 768-dimensional vector. The CLS is fed to a hidden neural layer with weight matrix of size (768,768). The hidden neural layer provides a new vector of size 768, which is fed to a Softmax layer with weight matrix of size (3,768). The Softmax layer provides a 3-dimensional vector. A Softmax function is applied over 3-dimensional vector to get the probabilities of each of the plurality of predetermined categories.

One of the predetermined categories is assigned to the hyperlink which has maximum probability. For example, in reference to FIG. 3, maximum probability is obtained for post-requisite category, so, the post-requisite category is assigned to the hyperlink "classifying".

It should be noted that FIG. 4 illustrates an embodiment of the disclosure and any other suitable model/block/layers may be used to classify the hyperlinks.

In an embodiment, the classified link may be represented by a modified link which define the hyperlink in a more relevant manner.

Figure 5:
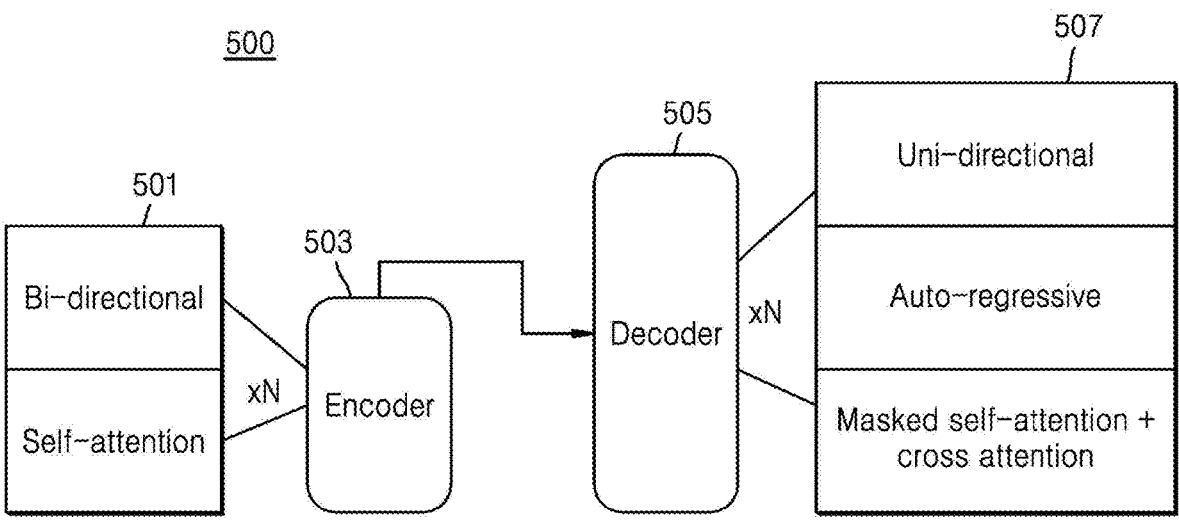
FIG. 5 illustrates a link representation, according to an embodiment of the disclosure.

FIG. 5 illustrates a link representator, according to an embodiment of the disclosure. In an embodiment, the link representator 500 may refer to the link representator 307 of FIG. 3.

Referring to FIG. 5, the link representator 500 may include a bi-directional and self-attention block 501, "N" number of encoders 503, "N" number of decoders 505, "a uni-directional, auto-regressive and masked self-attention+ cross attention block" 507.

Figure 6:
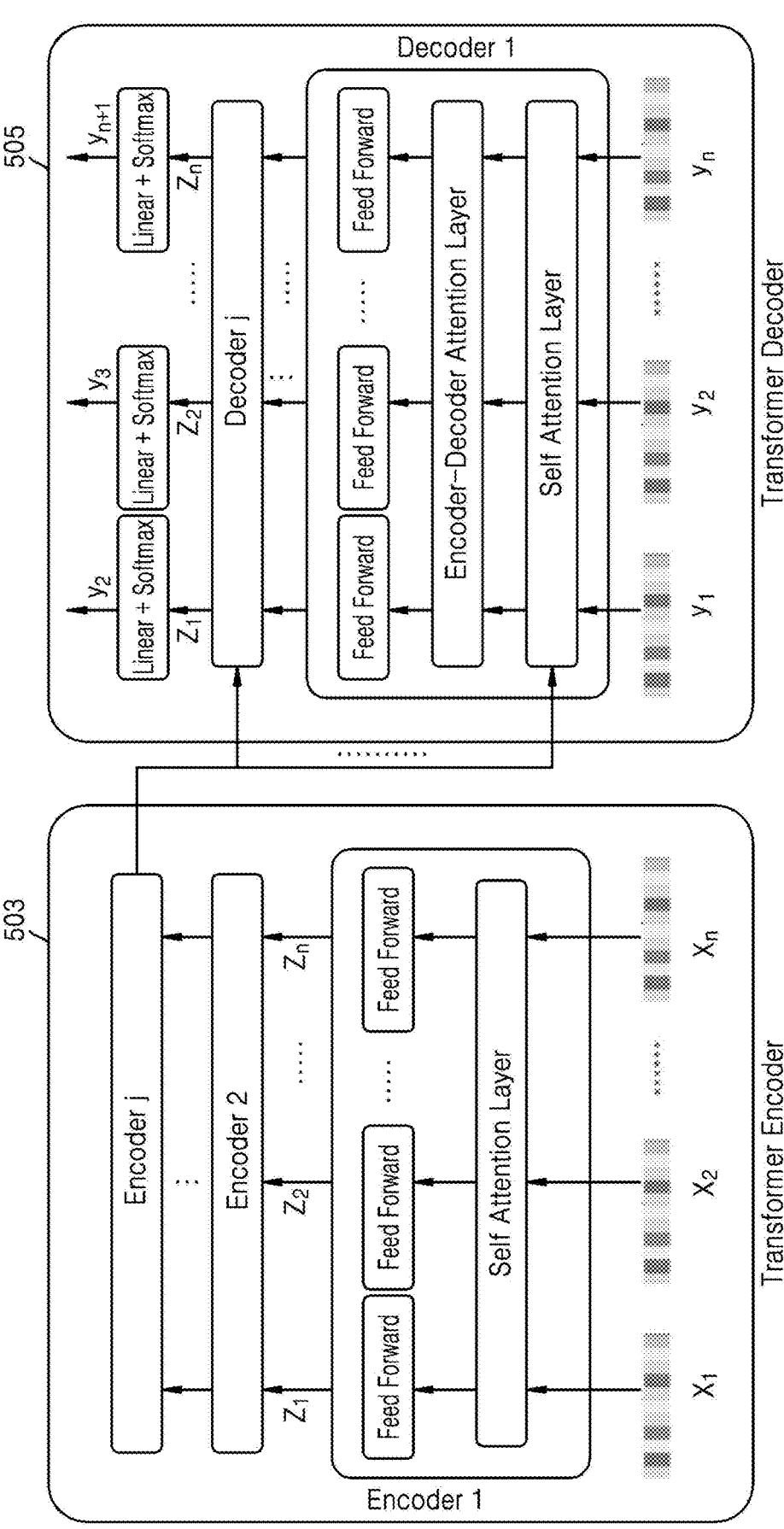
FIG. 6 illustrates an encoder and decoder of the link representator respectively, according to various embodiments of the disclosure.
Figure 7A:
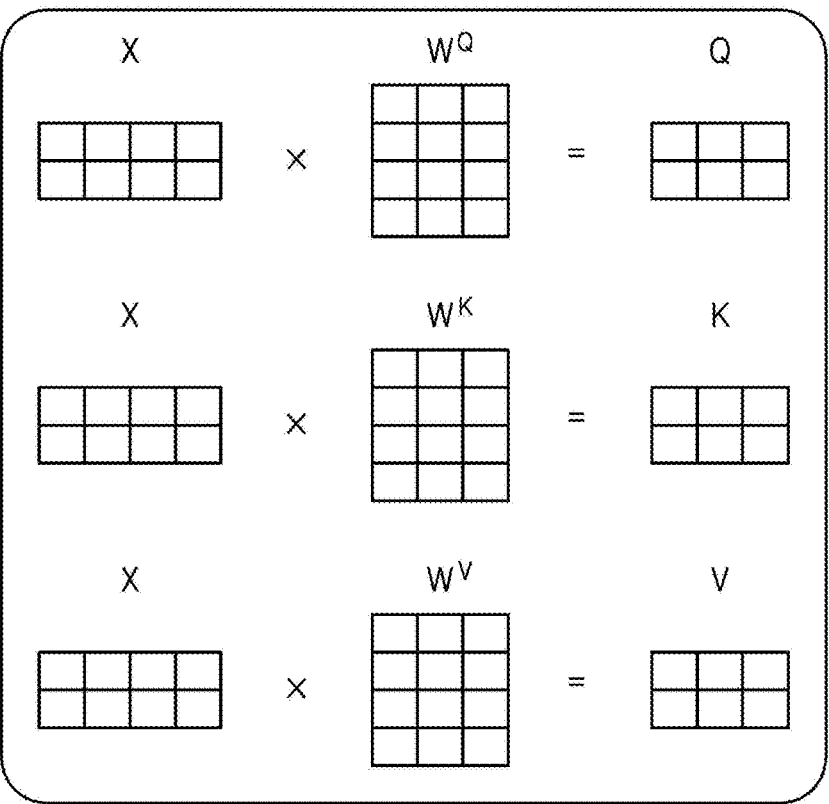
FIG. 7A illustrates various stages of a link representation list, according to an embodiment of the disclosure.

FIG. 6 illustrate an encoder and decoder of the link representator 500 respectively, according to various embodiments of the disclosure. FIGS. 5 and 6 are explained below in conjunction with each other:

Referring to FIGS. 5 and 6, the input text string for the encoder 503 is first tokenized into individual words/sub-words. The tokenized words are subsequently represented using word embeddings. Positional encodings are then added to each word to preserve the positional information for each word in the sentence. The final input to the module is represented as X, as shown in FIG. 7A. The input X is then passed to the encoder 503.

Figure 7B:
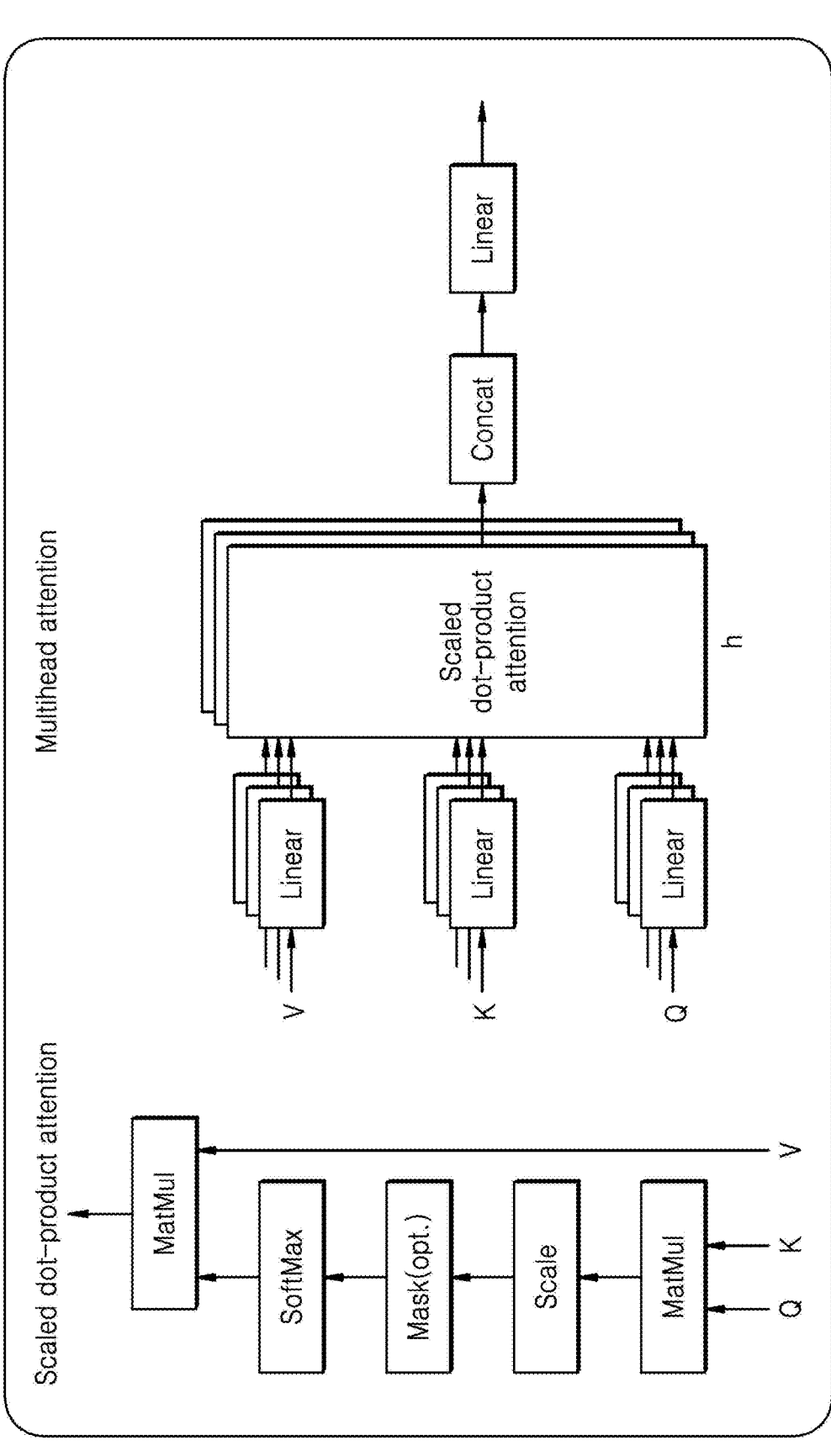
FIG. 7B illustrates Multi-Headed Self Attention Layer of the encoder and the decoder, according to an embodiment of the disclosure.

FIG. 7A illustrates various stages of a link representation list, according to an embodiment of the disclosure. FIG. 7B illustrates multi-headed self attention layer of the encoder 503, according to an embodiment of the disclosure.

Referring to FIG. 6, the encoder 503 comprises a multi-headed self attention layer, a normalization layer (not shown in FIG. 6), and a feed forward layer. The multi-headed self-attention layer uses a plurality of keys, values, and queries to calculate information selected from a plurality of input information in parallel for a linear projection. Each attention focuses on different parts of the input information to generate output values, and finally, these output values are concatenated and projected again to produce the intermediate representation. N such layers of encoders are cascaded to get the final encoder output Z. The output from the encoder 503 is fed to each layer of the decoder 505.

Referring to FIG. 6, the decoder comprises of a multi-headed self attention layer, an encoder-decoder attention layer and a feed forward layer. FIG. 7B illustrates multi-headed self attention layer of the decoder 505, according to an embodiment of the disclosure. The input to the decoder 505 during training is the target sentence tokens shifted right. In addition to this, a link embedding is also added at each input position to include the link information. Masked self-attention layer is used in the decoder 505 so that prediction at a given token depends only on past tokens. The encoder-decoder attention layer uses the decoder output as query and encoder output as keys and values. Hence, the decoder 505 can focus on relevant information from the encoded text. The final decoder representation is fed to an output Softmax layer which produces a probability distribution over the next output word. While testing, the final sentence is obtained using either greedy decoding or beam search over the word probability distribution generated from the decoder 505. For example, in reference to FIG. 3, the output of the link representator 307 for a hyperlink "vanish" is "vanish, vanishing gradient problem" as shown in block 309.

In an embodiment, the one or more hyperlinks from among the classified hyperlinks may be selected for the user. In an embodiment, the extraction unit 216 may extract user information from the memory 204 which stores at least one of the user profile information or browsing history information of the user. In an embodiment, the user information may include at least one of a profile information of the user, a demographic information of the user, educational qualifications of the user, published documents authored by the user, user uploaded documents and any other information related to the user. In an embodiment, the memory 204 may include a user's knowledge graph 311 which contains the user information. The creation of the user's knowledge graph 311 is explained in reference to FIG. 8. Further, the selection unit 218 may select the one or more hyperlinks based on the user information associated with the user accessing the document 303.

Figure 8:
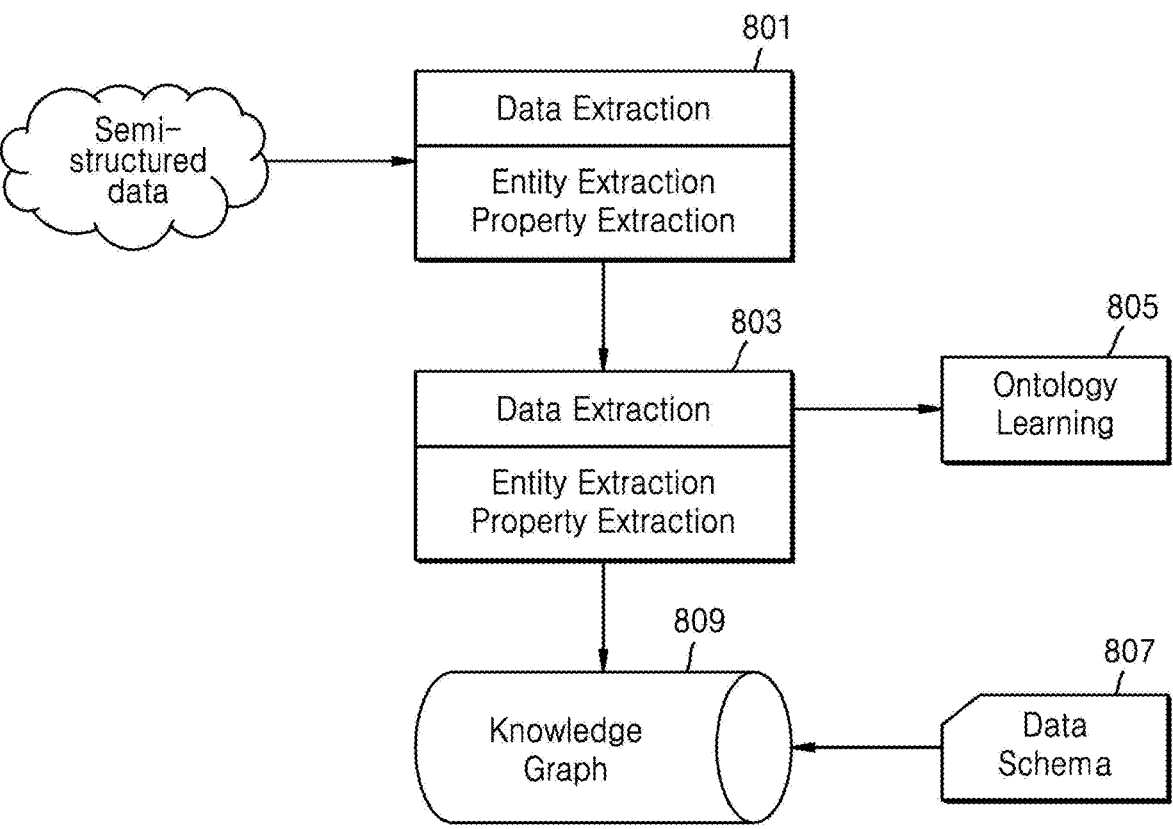
FIG. 8 illustrates a block diagram illustrating creation of user knowledge graph, according to an embodiment of the disclosure.

FIG. 8 illustrates a block diagram illustrating creation of the user knowledge graph, according to an embodiment of the disclosure.

Referring to FIG. 8, at block 801, the system 200 extracts entities such as entity and property from a structured, unstructured, and/or semi-structured data of the user. The data may include at least one of profile information of the user, demographic information of the user, educational qualifications of the user, published documents authored by the user, user uploaded documents, and any other information related to the user. Thereafter, at block 803, the system 200 links the extracted entity with any existing entities in the knowledge graph 809. However, if the extracted entity is not present in the knowledge graph 809, then the system 200 creates a new entity and adds a triplet of the entity (For example, thermodynamics, property, second law) to the graph. At block 805, the system 200 applies ontology learning to create the knowledge graph 809. The knowledge graph 809 may be similar to the user's knowledge graph 311 represented in FIG. 3. In an embodiment, the system 200 may create the knowledge graph 809 via a data schema 807.

Figure 9:
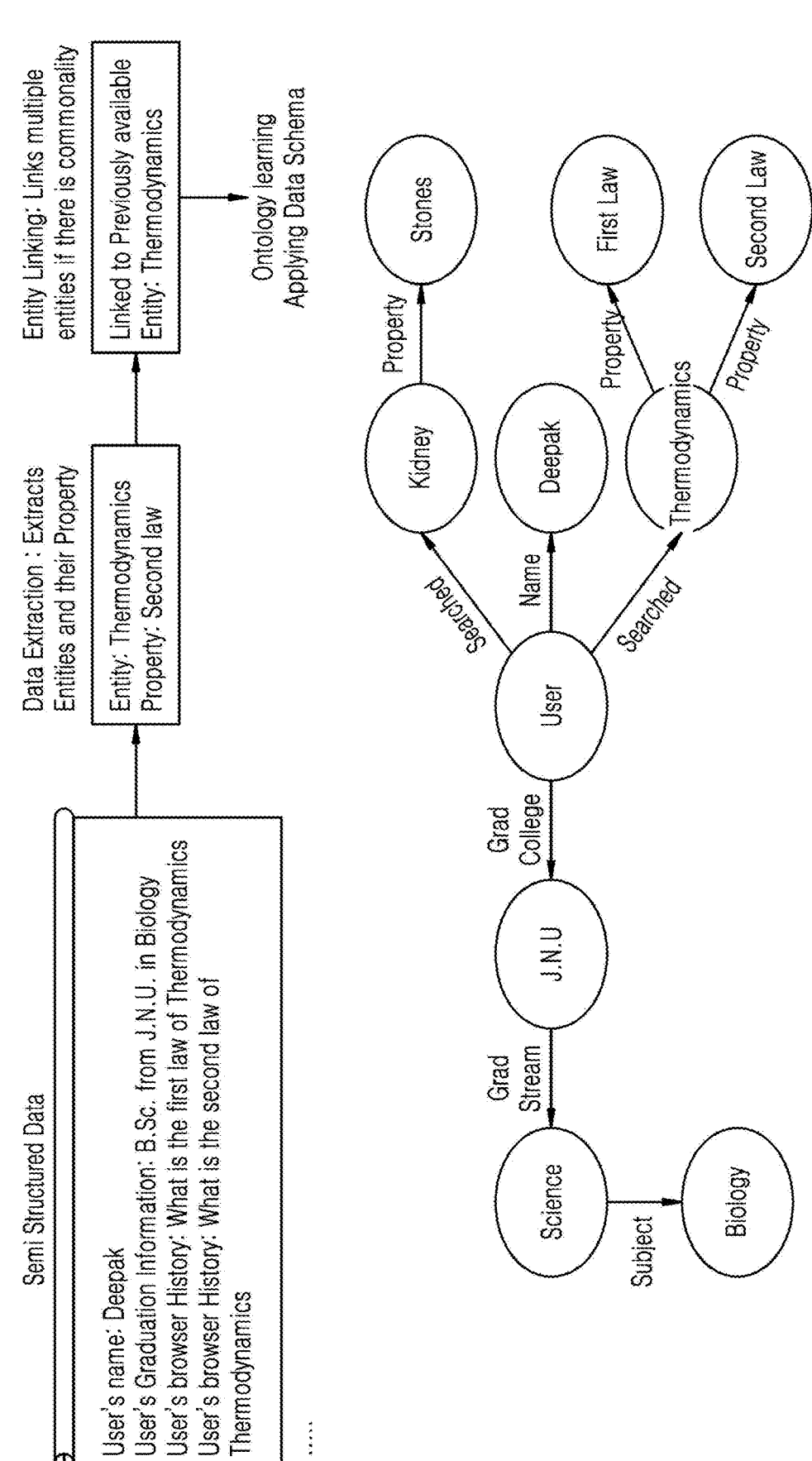
FIG. 9 illustrates an example of the creation of the user knowledge graph, according to an embodiment of the disclosure.

FIG. 9 illustrates an example of the creation of the user knowledge graph, according to an embodiment of the disclosure.

Referring to FIG. 9, the system 200 extracts an entity and property from the semi-structured data as thermodynamics and second law, respectively. Then, the system 200 determines an entity linking as Linked to Previously available Entity: Thermodynamics. Thereafter, the system 200 applies ontology learning to create the user knowledge graph which may include user information such as name, grad stream, college etc. In a further embodiment, to select the one or more hyperlinks based on the user information, the selection unit 218 may comprise a link selector 315a which selects the link based on the user information. In an embodiment, the selection unit 218 may also comprise a hierarchy builder 315b, which selects the link based on hierarchy of concepts/topics/user information.

Figure 10:
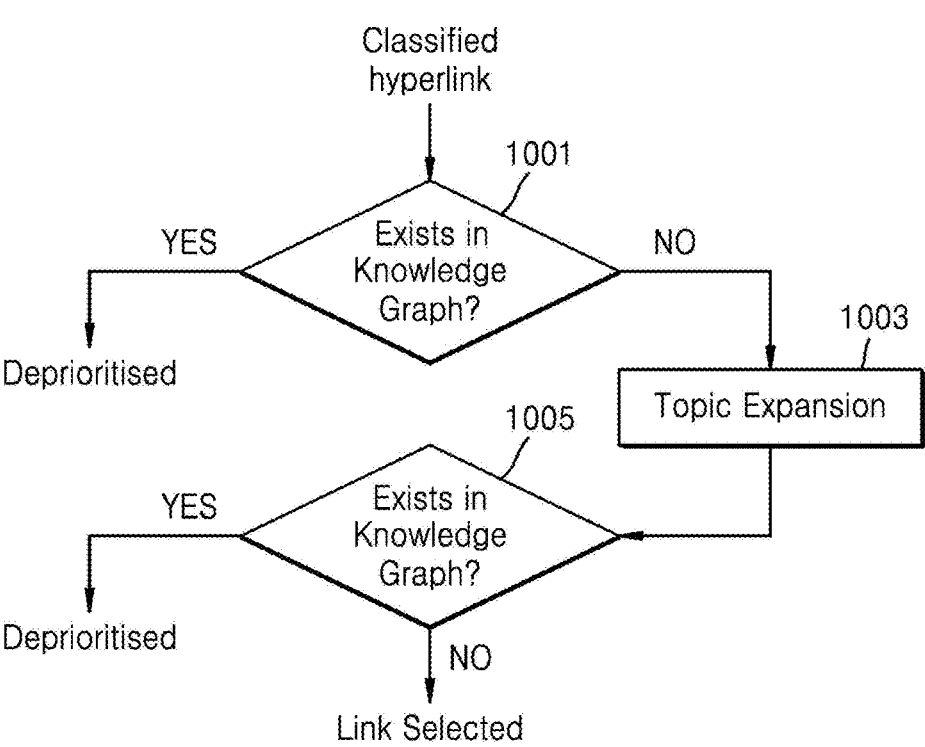
FIG. 10 illustrates a flow chart for selecting a hyperlink based on user information, according to an embodiment of the disclosure.

FIG. 10 illustrates a flow chart for selecting a hyperlink based on the user information, according to an embodiment of the disclosure.

Referring to FIG. 10, at operation 1001, the system 200 may determine if the classified hyperlink exists in the user knowledge graph 809. If yes, then the system 200 may deprioritize the link as the user has prior knowledge of that link. If not, then at operation 1003, the system 200 may expand the topic of the hyperlink. Then, at operation 1005, the system 200 may determine if the expanded topic exists in the user knowledge graph. If yes, then the system 200 may deprioritize the link as the user has prior knowledge of that topic. If not, then, the system 200 may select the link to be displayed to the user.

The generation unit 220 may generate a link representation list corresponding to the classified one or more hyperlinks, without using content of the one or more hyperlinks, based on the surrounding texts. For example, in reference to FIGS. 7A and 7B, the link representation list may be a list as shown in FIGS. 7A and 7B.

After the generation of the link representation list, the display unit 222 may display the link representation list on a graphical user interface (GUI). In an embodiment, the generation unit 220 may create a taxonomy including a list of concepts related to the text strings of the document 303.

Figure 11A:
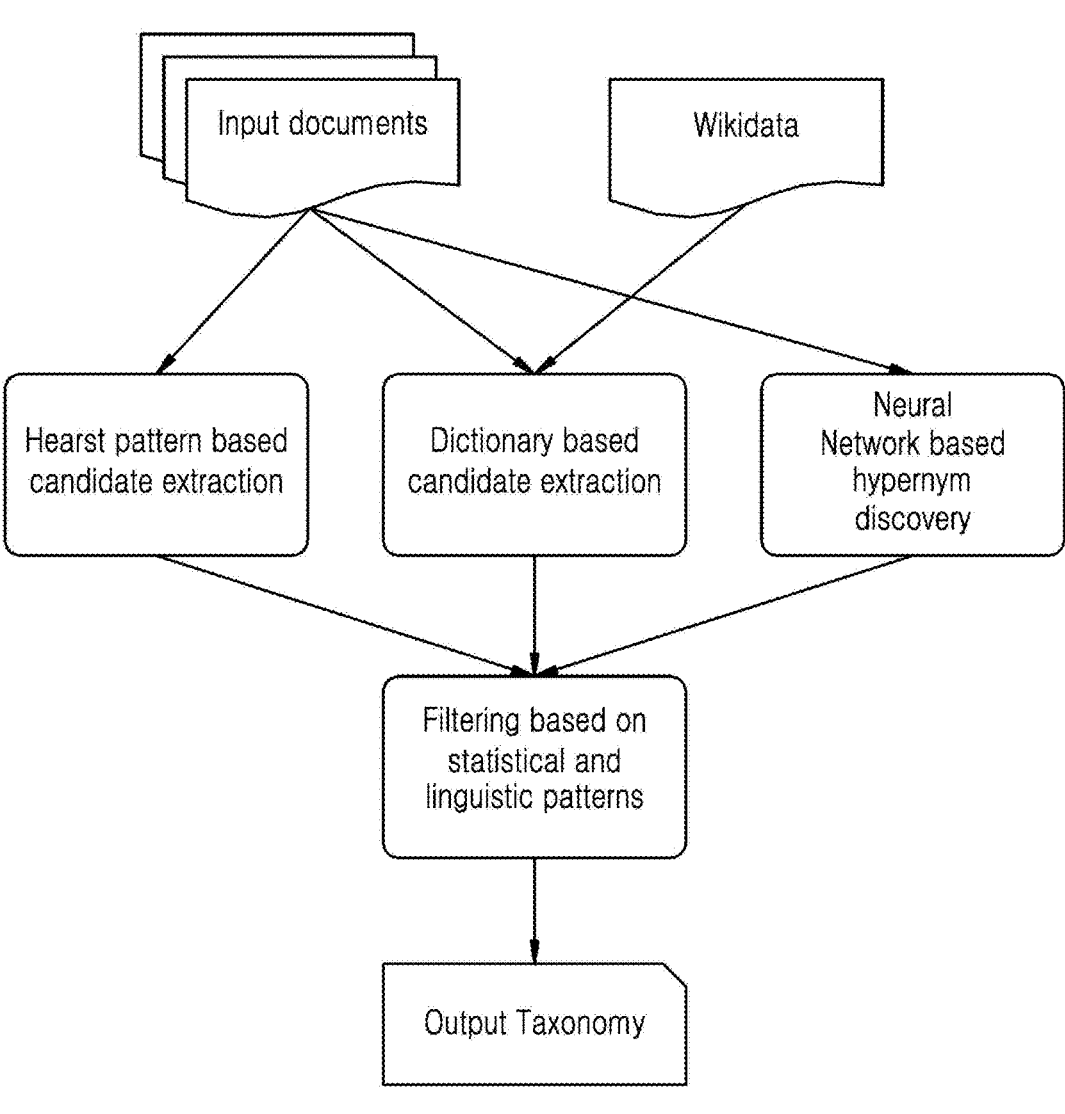
FIG. 11A illustrates creation of taxonomy and a taxonomy respectively, according to various embodiments of the disclosure.
Figure 11B:
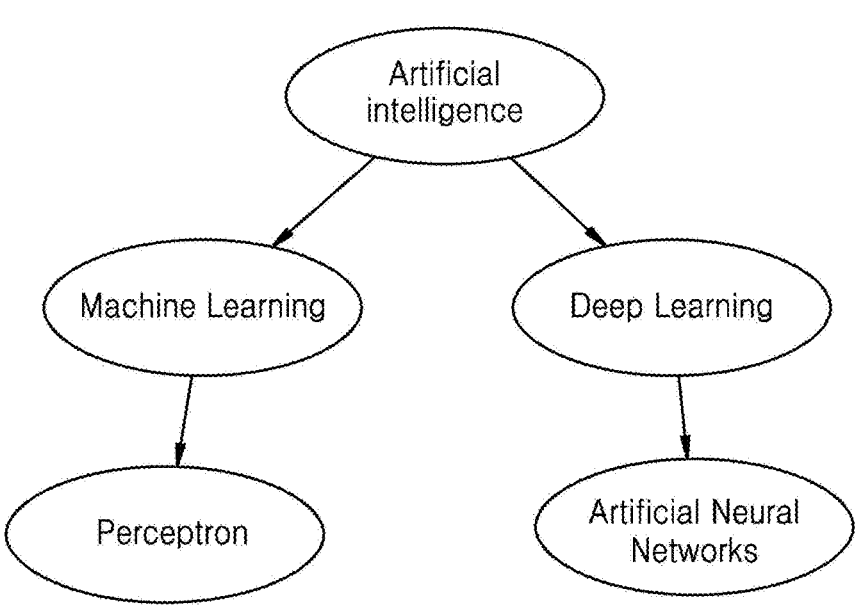
FIG. 11B illustrates creation of taxonomy and a taxonomy respectively, according to various embodiments of the disclosure.
Figure 12B:
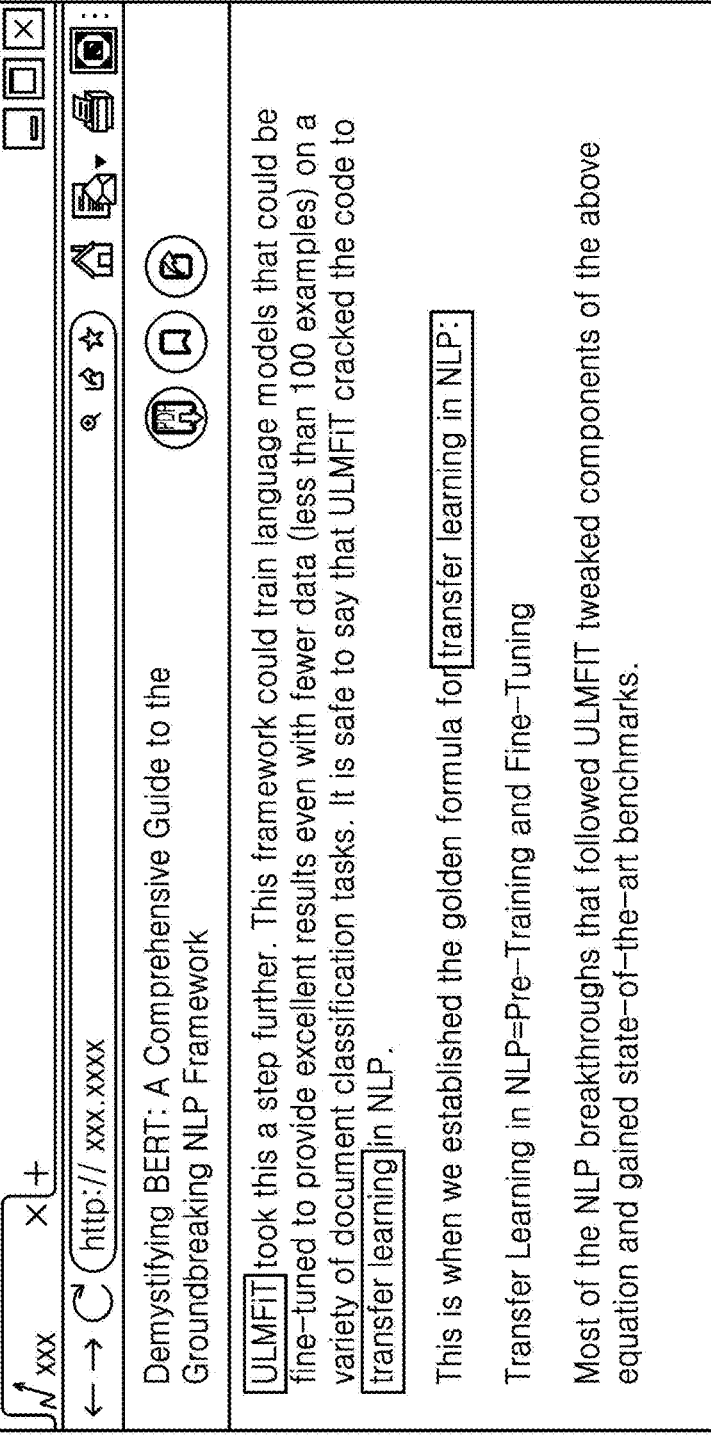
FIG. 12B illustrates various use cases of classifying the one or more hyperlinks in the document, according to various embodiments of the disclosure.
Figure 13:
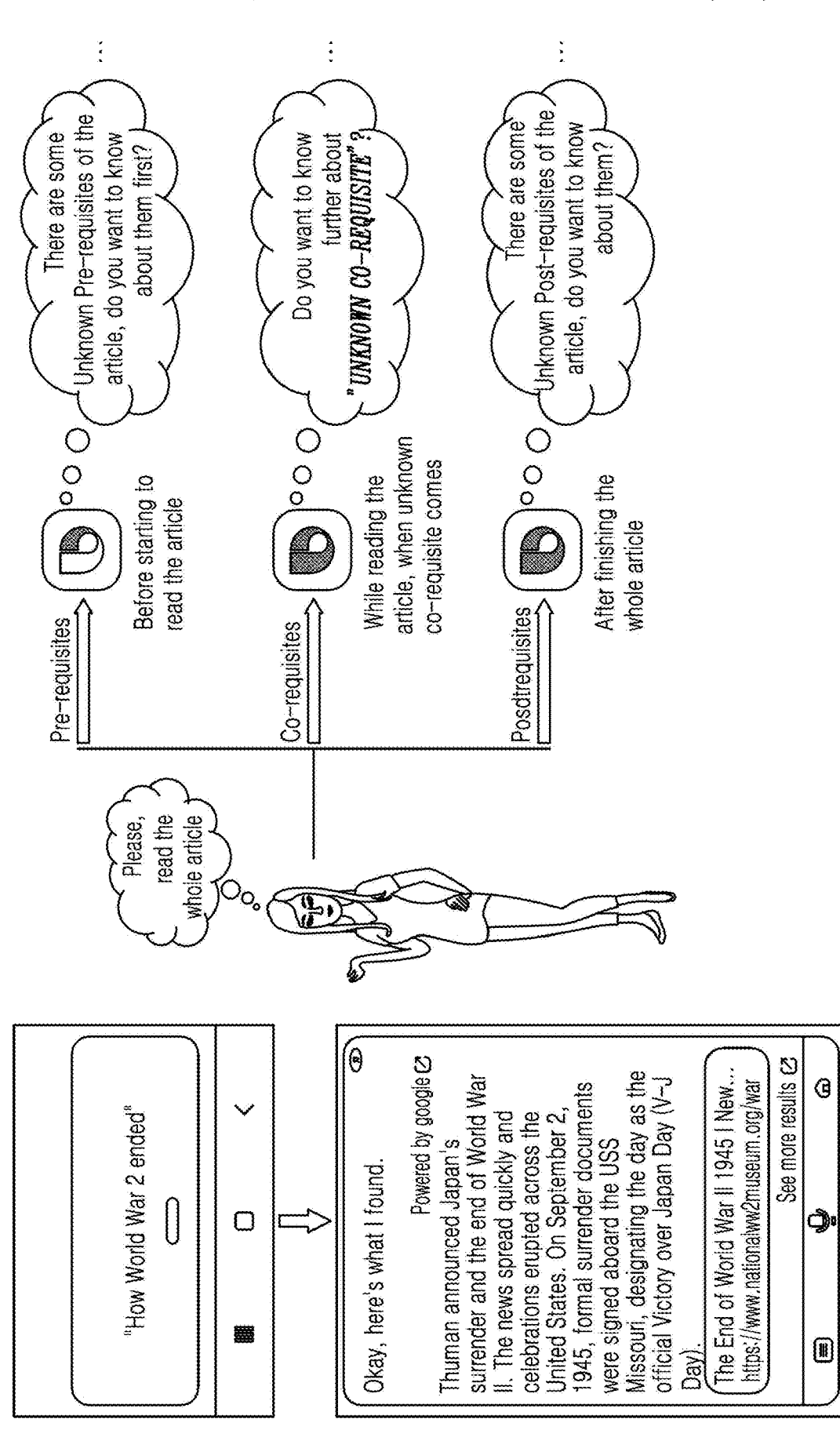
FIG. 13 illustrates various use cases of classifying the one or more hyperlinks in the document, according to various embodiments of the disclosure.

FIGS. 11A and 11B illustrate a creation of taxonomy and a taxonomy respectively, according to various embodiments of the disclosure. In an embodiment, the taxonomy created in FIG. 11A may refer to block 313 of FIG. 3.

Referring to FIG. 11A, the system 200 may use plurality of extraction techniques such as Hearst pattern based candidate extraction, Dictionary based candidate extraction, Neural Network based hypernym discovery, on the document and a Wiki data (i.e., general data related to concept of document) to extract relevant data related to the text strings surrounding the hyperlink. The system 200 may filter the extracted data based on statistical and linguistic patterns and the taxonomy is created.

Referring to FIG. 11B, a taxonomy of a concept "artificial intelligence" may include machine learning, deep learning, perceptron, artificial neural networks.

The generation unit 220 may arrange the one or more classified hyperlinks in a predefined order based on the taxonomy. The display unit 222 may display the link representation list based on the arrangement of the one or more classified hyperlinks in the predefined order. In an embodiment, the display unit 222 may display the link representation list on a graphical user interface (GUI) of the electronic device. For example, in reference to FIG. 3, the display unit 222 may display the link representation list 317.

FIGS. 12A, 12B, 12C, 12D, 13, 14, and 15 illustrate various use cases of classifying the one or more hyperlinks in the document 303, according to various embodiments of the disclosure.

Referring to FIGS. 12A, 12B, 12C, and 12D, a user wants to study about BERT. In accordance with the disclosed techniques, the hyperlinks in the document 303 are classified and displayed as below:

Pre-Requisites:
    Natural Language Processing (NLP)
    Language Models
    ULMFiT
Co-Requisites:
    LSTMs
    Transfer Learning in NLP
Post-Requisites:
    OpenAI's GPT Referring to FIG. 13, user asks a smart assistant "How World War II ended". Then, the smart assistant provides some answers. Thereafter, the user asks the smart assistant to read out the whole article. In accordance with the disclosed techniques, the smart assistant reads the article with information of hyperlinks classified in pre-, co- and post-requisite category.

Referring to FIG. 14, a family hub pro-actively suggests user to bake a cake with appropriate pre-requisites.

Referring to FIG. 15, user experience is enhanced while shopping in a website/App, by providing all the relevant information at one place before the purchase of the product, as shown below:

Pre-Requisites (Things to Know Before the Purchase):
    Specs: What is Bio Sleep mode?
    Offers: No cost EMI, 20k Advantage Program, HDFC
        bank cashback, ICICI back cashback
Co-Requisites
    Physical stores: Where to buy
    Manufacturers information: Cancellation, Return and
        Replacement Policy, Warranty Policy
    Related products: AR18BY5APWK, AR24BY4YBWK
Post-Requisites
    1. Usage/maintenance: AC filter cleaning, auto-clean AC,
        E121 Error, How to use Good sleep mode?

FIG. 16 illustrates comparison of classifying the one or more hyperlinks in the document 303 between the related and the disclosure, according to an embodiment of the disclosure.

Referring to FIG. 16, the user asks a smart assistant about Statue of Liberty. In response, the smart assistant asks user proactively about unknown pre-requisite and uses the embedded hyperlinks to provide the answer (i.e., No need to search again on the web).

This way, the disclosure classifies the hyperlinks in a more efficient way. For example, the hyperlinks in the document 303 are classified according to the user who is accessing the document 303 and/or the content of the document 303.

While specific language has been used to describe the disclosure, any limitations arising on account of the same are not intended. As would be apparent to a person in the art, various working modifications may be made to the method in order to implement the inventive concept as taught herein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for classifying one or more hyperlinks in a document, the method comprising:

identifying the one or more hyperlinks in the document based on an analysis of text strings of the document;

analyzing surrounding text strings around each of the one or more hyperlinks;

classifying, based on the analysis of the surrounding text strings around each of the one or more hyperlinks, the one or more hyperlinks into at least one category among a plurality of predetermined categories including at least two of a pre-requisite category, a co-requisite category, or a post-requisite category;

generating a link representation list corresponding to the classified one or more hyperlinks, without using content of the one or more hyperlinks, based on the surrounding text strings;

creating a taxonomy including a list of concepts related to the text strings of the document;

arranging the classified one or more hyperlinks in a predefined order based on the taxonomy; and displaying, on a graphical user interface (GUI), the link representation list, based on the arrangement of the classified one or more hyperlinks in the predefined order, each item in the link representation list being displayed on the GUI with an indication of its corresponding category among the pre-requisite category, the co-requisite category, or the post-requisite category.

2. The method of claim 1, further comprising:

extracting user information associated with a user accessing the document; and selecting at least one hyperlink among the classified one or more hyperlinks, based on the user information.

3. The method of claim 2, wherein the user information is extracted from memory having at least one of a user profile information or a browsing history information of the user stored therein.

4. The method of claim 2, wherein the user information includes at least one of profile information of the user, demographic information of the user, educational qualifications of the user, published documents authored by the user, or user uploaded documents.

5. The method of claim 1, wherein the classifying of the one or more hyperlinks further comprises:

classifying the one or more hyperlinks using the surrounding text strings without referring to the one or more hyperlinks.

6. The method of claim 1, wherein the document corresponds to one of a text document, a web document, an application based documents, or a cloud based document.

7. A system for classifying one or more hyperlinks in a document, the system comprising:

a display;

memory storing instructions; and one or more processors communicatively coupled to the display and the memory, wherein the instructions, when executed by the one or more processors individually or collectively, cause the system to:

identify the one or more hyperlinks in the document based on an analysis of text strings of the document, analyze surrounding text strings around each of the one or more hyperlinks, classify, based on the analysis of the surrounding text strings around each of the one or more hyperlinks, the one or more hyperlinks into at least one category among a plurality of predetermined categories including at least two of a pre-requisite category, a co-requisite category, or a post-requisite category, generate a link representation list corresponding to the classified one or more hyperlinks, without using content of the one or more hyperlinks, based on the surrounding text strings, create a taxonomy including a list of concepts related to the text strings of the document, arrange the classified one or more hyperlinks in a predefined order based on the taxonomy, and display, on a graphical user interface (GUI) via the display, the link representation list, based on the arrangement of the classified one or more hyperlinks in the predefined order, each item in the link representation list being displayed on the GUI with an indication of its corresponding category among the pre-requisite category, the co-requisite category, or the post-requisite category.

8. The system of claim 7, wherein the instructions, when executed by the one or more processors individually or collectively, further cause the system to:

extract user information associated with a user accessing the document, and select at least one hyperlink among the classified one or more hyperlinks, based on the user information.

9. The system of claim 8, wherein the instructions, when executed by the one or more processors individually or collectively, further cause the system to;

extract the user information from the memory having at least one of a user profile information or a browsing history information of the user stored therein.

10. The system of claim 8, wherein the user information includes at least one of profile information of the user, demographic information of the user, educational qualifications of the user, published documents authored by the user, or user uploaded documents.

11. The system of claim 7, wherein the instructions, when executed by the one or more processors individually or collectively, further cause the system to:

classify the one or more hyperlinks using the surrounding text strings without referring to the one or more hyperlinks.

12. The system of claim 7, wherein the document corresponds to one of a text document, a web document, an application based documents, or a cloud based documents.

13. The system of claim 7, further comprising:

an input device, wherein the instructions, when executed by the one or more processors individually or collectively, further cause the system to:

receive, via the input device, user input, and acquire the document based on the received user input.

14. The system of claim 7, wherein the instructions, when executed by the one or more processors individually or collectively, further cause the system to:

store, in the memory, user information as a knowledge graph.

* * * * *